United States Patent
Xiao et al.

(10) Patent No.: US 12,114,343 B2
(45) Date of Patent: Oct. 8, 2024

(54) METHOD FOR TRANSMITTING SIGNALING INFORMATION, AND COMMUNICATION NODE AND STORAGE MEDIUM

(71) Applicant: ZTE CORPORATION, Shenzhen (CN)

(72) Inventors: Huahua Xiao, Shenzhen (CN); Chuangxin Jiang, Shenzhen (CN); Zhaohua Lu, Shenzhen (CN); Shujuan Zhang, Shenzhen (CN); Yu Ngok Li, Shenzhen (CN); Hao Wu, Shenzhen (CN); Xinquan Ye, Shenzhen (CN); Shijia Shao, Shenzhen (CN); Yu Pan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 318 days.

(21) Appl. No.: 17/639,941

(22) PCT Filed: Aug. 21, 2020

(86) PCT No.: PCT/CN2020/110425
§ 371 (c)(1),
(2) Date: Mar. 3, 2022

(87) PCT Pub. No.: WO2021/043008
PCT Pub. Date: Mar. 11, 2021

(65) Prior Publication Data
US 2022/0330258 A1     Oct. 13, 2022

(30) Foreign Application Priority Data
Sep. 3, 2019    (CN) .................. 201910828953.X

(51) Int. Cl.
*H04W 72/542*     (2023.01)
*H04L 5/00*     (2006.01)
(Continued)

(52) U.S. Cl.
CPC .......... *H04W 72/542* (2023.01); *H04L 5/0051* (2013.01); *H04W 72/0446* (2013.01); *H04W 72/23* (2023.01)

(58) Field of Classification Search
CPC ... H04L 5/0023; H04L 5/0048; H04L 5/0051; H04L 5/0091; H04W 72/046;
(Continued)

(56) References Cited

U.S. PATENT DOCUMENTS

| 2018/0034529 A1* | 2/2018 | Hessler ................. H04B 7/024 |
| 2019/0075524 A1* | 3/2019 | Zhou .................... H04W 72/046 |

(Continued)

FOREIGN PATENT DOCUMENTS

| CN | 101958779 A | 1/2011 |
| CN | 102316526 A | 1/2012 |

(Continued)

OTHER PUBLICATIONS

International Search Report and Written Opinion, PCT/CN2020/110425. Mailing date of search report, Nov. 4, 2020.
(Continued)

*Primary Examiner* — Habte Mered
*Assistant Examiner* — Prince A Mensah
(74) *Attorney, Agent, or Firm* — BOND, SCHOENECK & KING, PLLC; George R. McGuire

(57) ABSTRACT

Provided are a method and apparatus for transmitting signaling information, a communication node and a storage medium. The method for transmitting signaling information includes the following steps: signaling information is received; and channel state information of M physical uplink channels is determined based on the signaling information, where M is a positive integer greater than 1.

20 Claims, 3 Drawing Sheets

(51) Int. Cl.
*H04W 72/0446* (2023.01)
*H04W 72/23* (2023.01)

(58) Field of Classification Search
CPC ........ H04W 72/0446; H04W 72/0453; H04W 72/23; H04W 72/563
See application file for complete search history.

(56) References Cited

U.S. PATENT DOCUMENTS

| | | | | |
|---|---|---|---|---|
| 2019/0103949 | A1* | 4/2019 | Harrison | H04B 7/0456 |
| 2021/0068142 | A1* | 3/2021 | Park | H04W 72/0453 |
| 2021/0099214 | A1* | 4/2021 | Ren | H04W 72/563 |
| 2021/0211893 | A1* | 7/2021 | Shao | H04W 72/23 |
| 2021/0345390 | A1* | 11/2021 | Okamura | H04W 72/23 |

FOREIGN PATENT DOCUMENTS

| | | | |
|---|---|---|---|
| CN | 103220795 | A | 7/2013 |
| CN | 108111283 | A | 6/2018 |
| CN | 108112075 | A | 6/2018 |
| CN | 108260217 | A | 7/2018 |
| CN | 108282274 | A | 7/2018 |
| CN | 109699075 | A | 4/2019 |
| CN | 109802755 | A | 5/2019 |
| CN | 110535589 | A | 12/2019 |
| CN | 110838902 | A | 2/2020 |
| EP | 2534785 | A1 | 12/2012 |
| WO | 2018182381 | A1 | 10/2018 |
| WO | 2018202217 | A1 | 11/2018 |
| WO | 2019029378 | A1 | 2/2019 |
| WO | 2019032855 | A1 | 2/2019 |
| WO | 2019047950 | A1 | 3/2019 |
| WO | 2019111619 | A1 | 6/2019 |

OTHER PUBLICATIONS

Lenovo et al. "Discussion on UL multi-panel transmissio" 3GPP TSG RAN WG1 Meeting #96bis R1-1904574, Mar. 20, 2019, section 2.

European Search Report, Application No. 20861209.3, dated Sep. 1, 2023, pp. 1-13.

Translated CN Supplemental Search Report, Application No. 201910828953X, dated Jul. 2, 2024, pp. 1-8.

* cited by examiner

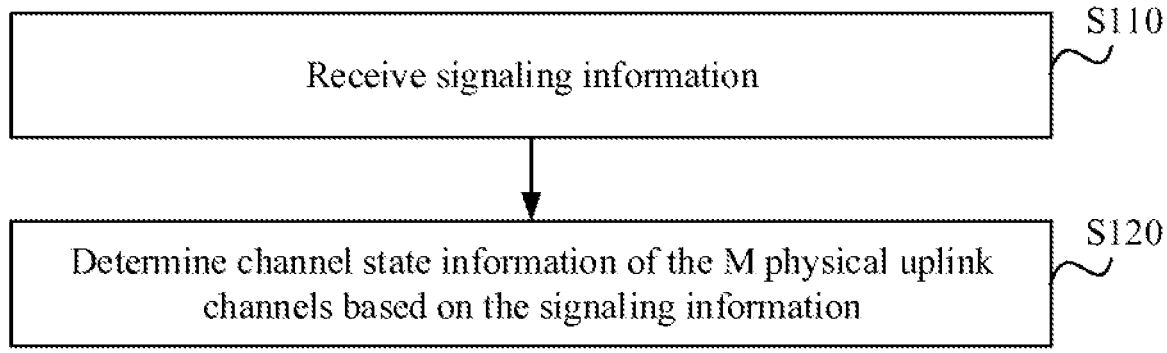
FIG. 1
FIG. 2
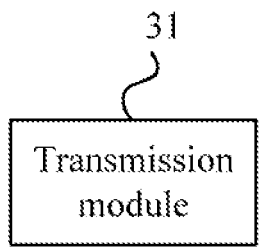
FIG. 3
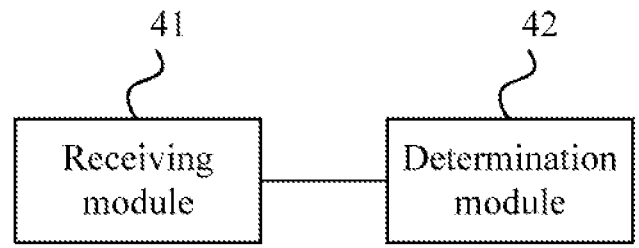
FIG. 4

METHOD FOR TRANSMITTING SIGNALING INFORMATION, AND COMMUNICATION NODE AND STORAGE MEDIUM

CROSS-REFERENCE TO RELATED APPLICATIONS

This is a National Stage Application, filed under 35 U.S.C. 371, of International Patent Application No. PCT/CN2020/110425, filed on Aug. 21, 2020, which claims priority to Chinese Patent Application No. 201910828953.X filed with the China National Intellectual Property Administration (CNIPA) on Sep. 3, 2019, the disclosures of which are incorporated herein by reference in their entireties.

TECHNICAL FIELD

The present application relates to the field of communications, for example, a method and apparatus for transmitting signaling information, a communication node and a storage medium.

BACKGROUND

Joint transmission or reception by multiple transmission and reception points (multi-TRP) is an important technology in wireless communication, playing a significant role in increasing the throughput of wireless communication. Therefore, multi-TRP transmission is supported by standards such as long term evolution (LTE), long term evolution-advanced (LTE-A), and new radio access technology (NR). Multi-panel transmission is an important technique introduced in NR. In the multi-panel transmission, a plurality of antenna panels are installed at a receiving end and/or a transmitting end to improve the spectral efficiency of a wireless communication system. In addition, repetition transmission or repetition reception using the multi-TRP or multi-panel is an effective measure for improving reliability, and the wireless communication system, especially the ultra-reliable low latency communications (URLLC) transmission reliability can be improved.

However, how to determine the channel state information of an uplink channel in uplink repetition transmission of multi-TRP and/or multi-panel needs to be solved urgently.

SUMMARY

The present application provides a method and apparatus for transmitting signaling information, a communication node and a storage medium.

An embodiment of the present application provides a method for transmitting signaling information. The method includes receiving signaling information; and determining channel state information of the M physical uplink channels based on the signaling information, where M is a positive integer greater than 1.

An embodiment of the present application further provides a method for transmitting signaling information. The method includes transmitting signaling information, where the signaling information is configured to indicate channel state information of the M physical uplink channels, where M is a positive integer greater than 1.

An embodiment of the present application further provides an apparatus for transmitting signaling information. The apparatus includes a receiving module and a determination module.

The receiving module is configured to receive signaling information. The determination module is configured to determine channel state information of the M physical uplink channels based on the signaling information, where M is a positive integer greater than 1.

An embodiment of the present application further provides an apparatus for transmitting signaling information. The apparatus includes a transmission module.

The transmission module is configured to transmit signaling information, where the signaling information is configured to indicate channel state information of the M physical uplink channels, where M is a positive integer greater than 1.

An embodiment of the present application further provides a communication node. The communication node includes one or more processors and a storage apparatus.

The storage apparatus is configured to store one or more programs.

When the one or more programs are executed by the one or more processors, the one or more processors are caused to implement the method for transmitting signaling information according to embodiments of the present application.

An embodiment of the present application further provides a communication node. The communication node includes one or more processors and a storage apparatus.

The storage apparatus is configured to store one or more programs. When the one or more programs are executed by the one or more processors, the one or more processors are caused to implement the method for transmitting signaling information according to embodiments of the present application.

An embodiment of the present application further provides a storage medium. The storage medium stores a computer program. When the computer program is executed by a processor, any method for transmitting signaling information is implemented according to the embodiment of the present application.

BRIEF DESCRIPTION OF DRAWINGS

FIG. 1 is a flowchart of a method for transmitting signaling information according to an embodiment of the present application;

FIG. 2 is a flowchart of another method for transmitting signaling information according to an embodiment of the present application;

FIG. 3 is a diagram illustrating the structure of an apparatus for transmitting signaling information according to an embodiment of the present application;

FIG. 4 is a diagram illustrating the structure of another apparatus for transmitting signaling information according to an embodiment of the present application;

DETAILED DESCRIPTION

Figure 5:
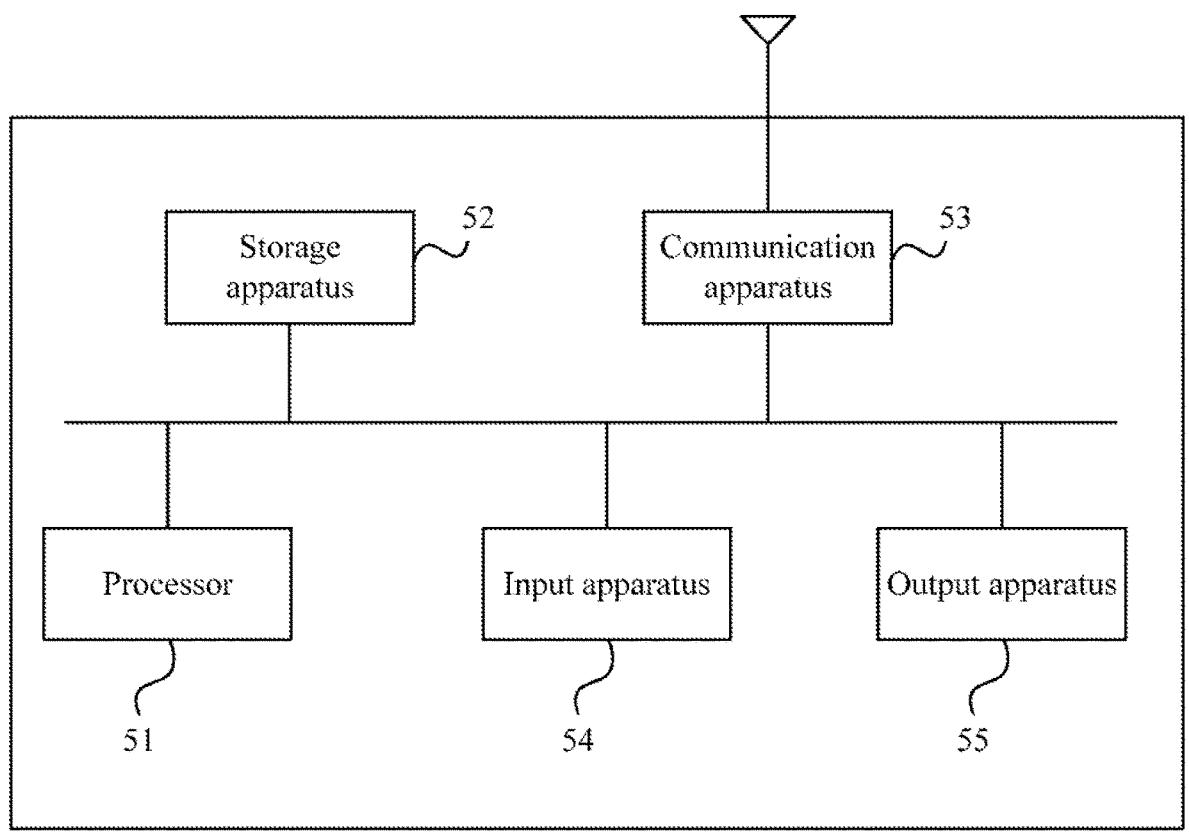
FIG. 5 is a diagram illustrating the structure of a communication node according to an embodiment of the present application.

Embodiments of the present application are described below with reference to the drawings.

The steps illustrated in the flowcharts of the drawings may be performed by a computer system such as a group of computers capable of executing instructions. Although logical sequences are illustrated in the flowcharts, the illustrated or described steps may be performed in sequences different from those described herein in some cases.

In one exemplary implementation, FIG. 1 is a flowchart of a method for transmitting signaling information according to an embodiment of the present application. The method may be applied to a case of determining the channel state information of the uplink channel and may be executed by an apparatus for transmitting signaling information provided by the present application. The apparatus for transmitting signaling information may be implemented by software and/or hardware and integrated on a communication node. The communication node covers any suitable type of user terminal.

Concepts in the present application are described below.

In the present application, one panel may correspond to one port group (for example, antenna port group, antenna group), and panels and port groups may be in the one-to-one correspondence or may be interchangeable with each other. A panel refers to an antenna panel, and one transmission reception point (TRP) or a communication node (including, but not limited to, a terminal, a base station, and the like) may include at least one antenna panel. Each panel has one or more antenna elements. A plurality of elements may be virtualized into one antenna port. The antenna ports on one panel may be divided into one port group. One panel may be divided into a plurality of sub-panels, and a plurality of antenna ports included in each sub-panel may be divided into one port group. For example, for a dual-polarization antenna, an antenna with a positive 45° polarization is one sub-panel, and an antenna with a negative 45° polarization is one sub-panel. In embodiments of the present application, the panel and the sub-panel are collectively referred to as a panel, denoted by panel. The panel may be replaced by a port group (or spatial parameters, such as transmit beam, receiving beam, quasi-co-location type (type D)).

A transmission unit includes an uplink transmission unit and a downlink transmission unit. The uplink transmission unit may be an antenna panel, a panel, a sub-panel, a port group corresponding to an antenna panel (or short for, a port group), a port sub-group, a port group corresponding to one TRP, or the like. One port group includes at least one port. The transmission unit is a logical port group, or at least one of a physical antenna group, antenna component, antenna array element group, panel, sub-panel, or the like for receiving a physical downlink shared channel or a physical downlink control channel or for transmitting a physical uplink shared channel or a physical uplink control channel. The uplink transmission unit index refers to at least one of an antenna panel index, a panel index, a sub-panel index, a port group index corresponding to an antenna panel, a port group index, a port group index corresponding to one TRP, and a port sub-group index.

To acquire channel state information, a reference signal needs to be sent. The reference signal includes, but not limited to, a channel state information-reference signal (CSI-RS) resource, a synchronization signal block (SSB) resource, a physical broadcast channel (PBCH) resource, a synchronization signal/physical broadcast channel (SS/PBCH) resource, and an uplink sounding reference signal (SRS) resource. The CSI-RS resource mainly refers to a non zero power channel state information-reference signal (NZP-CSI-RS) resource. A reference resource set includes one or more reference signal resources, such as a CSI-RS resource set, an SRS resource set, and an SSB resource set. One reference resource configuration may include one or more reference resource sets, such as a CSI-RS resource configuration (CSI-RS resource config), an SSB resource configuration (SSB resource config), and an SRS resource configuration (SRS resource config). In this case, config may be changed to setting. Generally, one SRS resource set includes K SRS resources, that is, SRS resources. For example, resource indexes of the K SRS resources are stored. In codebook-based uplink transmission, the value of K is 1 or 2. In non-codebook-based uplink transmission, the value of K is one of 1, 2, 3, or 4. Alternatively, a plurality of reference signal resources included in one reference signal resource set may be divided into a plurality of reference signal resource groups. Unless otherwise specified, the reference signal resource set and the reference signal resource group in the present application can be replaced with each other.

The identifier (ID) in the present application is used for identifying the sequence number and index of one object, for example, an index corresponding to one reference signal resource, a reference signal resource group, a reference signal resource configuration, a channel state information (CSI) report, a CSI report set, a terminal, a base station, a panel, or the like.

To transmit data or signaling, physical channels are divided into physical downlink control channels (PDCCHs), physical uplink control channels (PUCCHs), physical downlink shared channels (PDSCHs), physical uplink shared channel (PUSCHs), and physical random access channels (PRACHs) in the standards. The PDCCH is mainly used for transmitting physical downlink control information (DCI), while the PUCCH is mainly used for transmitting uplink control information such as channel state information (CSI), hybrid automatic repeat request (HARQ), and scheduling request. The PDSCH is mainly used for transmitting downlink data, and the PUSCH is mainly used for transmitting uplink data, CSI, and the like. The CSI includes downlink channel state information fed back by the terminal and uplink channel state information of the terminal indicated by the base station. The downlink channel state information includes, but is not limited to, at least one of a CSI-RS resource indicator (CRI), a synchronization signals block resource indicator (SSBRI), a channel quality indicator (CQI), a precoding matrix indicator (PMI), a layer indicator (LI), and a rank indicator (RI). The uplink channel state information includes, but is not limited to, at least one of an uplink SRS resource indicator (SRI), a transmitted precoding matrix indicator (TPMI), a transmitted rank indicator (TRI), a modulation and coding scheme (MCS), a spatial filtering parameter, a spatial correlation parameter, and a beam parameter. In addition, the TPMI and TRI may be jointly encoded, and the precoding information and number of layers field of the downlink control signaling is used to indicate the joint TPMI and TRI. The spatial filtering parameter, spatial correlation parameter, and beam parameter may also be indicated by the SRI or determined by a quasi-co-located (QCL) parameter. The uplink channel state information may also be referred to as an uplink channel parameter. The uplink sounding signal resource indicator field in the downlink control information includes one uplink sounding signal resource indicator for indicating the SRS resource index (or indicator) in the SRS resource set, mainly for the codebook-based uplink transmission, or includes one set of uplink sounding signal resource indicators for indicating the SRS resource index (or indicator) in the SRS resource set, mainly for the non-codebook-based uplink transmission. The PRACH is a channel for transmitting the uplink random access information. A physical uplink channel includes at least one of the following: a PUSCH, a PUCCH, or a PRACH, and a physical downlink channel includes at least one of the following: a PDSCH or a PDCCH. M physical uplink channels in the present application may be M physical uplink channel resources for transmitting physical uplink data, or one time of transmission of one physical uplink channel resource at different transmission time, or on different transmission carriers, or on different transmission sub-bands. For example, M PUSCHs include M PUSCH channel resources for transmitting uplink data on different uplink transmission units, or M times of transmission of physical uplink data on one PUSCH resource at different time. Similarly, M physical downlink channels in the present application may be M physical downlink channel resources, or one time of transmission of one physical downlink channel resource at different transmission time, or on different transmission carriers, or on different transmission sub-bands. For example, M PDCCHs may include M PDCCH channels, or one PDCCH channel is transmitted M times at different time or in different frequency domain. The PDCCH carries control channel information (such as, DCI). The uplink data transmitted in the M physical uplink channels may be referred to as transmission information, and the transmission information may be information before channel coding, or one transport block, or one code block or a large coding block corresponding to multiple coding blocks in the uplink control information. The channel state information of the M physical uplink channels described in the present application is the uplink channel state information since the PUSCH, the PUCCH, and the like are all uplinks. The transmission in the present application may be transmitting or receiving.

To improve the reliability of the data or signaling transmission, one manner is repetition transmission. The transmission of M pieces of data (for example, PDSCHs or PUSCHs) is the repetition transmission, representing that the M pieces of data carry exactly the same information. For example, the M pieces of data are from the same transport block (TB), except that the redundancy versions (RVs) corresponding to the M pieces of data after the channel coding are different, and even the RVs of the M pieces of data after the channel coding are the same. The RVs refer to different redundancy versions of the transmit data after the channel coding. Generally, the RV may be a channel version of $\{0, 1, 2, 3\}$. Similarly, the transmission of M pieces of signaling (for example, PDCCHs or PUCCHs) is the repetition transmission, representing that the M pieces of signaling carry the same content. For example, M PDCCHs carry the same content of the DCI (for example, the value of each field is the same). For example, M PUCCHs carry the same value of the content. M pieces of repetition data (for example, M repetition PUSCHs or M repetition PDSCHs) or M pieces of repetition signaling (for example, M repetition PUCCHs or M repetition PDCCHs) may be from M different TRPs, or M different antenna panels, or M different bandwidth parts (BWPs), or M different component carriers (CCs). The M panels, M BWPs, or M CCs may belong to the same TRP or may belong to a plurality of TRPs.

In standards such as the NR, the PDCCH needs to be mapped to a set of resource elements (REs), such as including one or more control channel elements (CCEs). One RE includes one subcarrier in the frequency domain and one symbol in the time domain. A set of one or more CCEs for transmitting the PDCCH is sometimes called a control resource set (CORESET) and includes a plurality of physical resource blocks in the frequency domain and K symbols in the time domain. K is a natural number, for example, K may be an integer of 1, 2, or 3. The symbols include, but are not limited to, one of orthogonal frequency division multiplexing (OFDM) symbols, single-carrier frequency division multiple access (SC-FDMA), or orthogonal frequency division multiple access (OFDMA). To detect the PDCCH, candidate PDCCHs of one aggregation level are configured as one set. A set of candidate PDCCHs under this level is a search space (SS), and the set of a plurality of search spaces forms one search space set (SS set, SSSET, or SSS). Each terminal may configure at least one search space set. To detect the PDCCH, a PDCCH detection occasion of the current terminal and a detected PDCCH candidate or a PDCCH candidate are configured in the search space. The occasion is also called the PDCCH monitoring occasion, and at the occasion, the time domain information of the detected PDCCH is determined through the PDCCH monitoring periodicity, the PDCCH monitoring offset, the PDCCH monitoring pattern, and the like on an activated downlink bandwidth part. The candidate is also called a PDCCH monitoring candidate and is one candidate to-be-detected PDCCH configured in the search space. In addition, the PDCCH includes a plurality of formats, each format corresponds to downlink control information (DCI) in the corresponding format, and each DCI includes a plurality of signaling indicator fields. The detection may also be referred to as monitoring or blind detection and is mainly configured to determine which of the plurality of candidate PDCCHs is the PDCCH used for transmitting the downlink control information to the terminal.

In the present application, the transmitted time unit may include a set of one or more symbols, such as one slot, or one mini slot.

In the embodiments listed in the present application, if there is no description, generally one terminal and at least two TRPs are included (or two panels are included in one TRP), and the terminal includes M panels. The M panels respectively transmit M PUSCHs. The transmission of M PUSCHs is the repetition transmission, and the M PUSCHs may be from M terminals, or M panels, or M CCs, or M BWPs. The M panels, or M CCs, or M BWPs may be from one terminal or a plurality of terminals. For example, one panel or one port group corresponds to one PUSCH transmission. The M repetition PUSCHs may be transmitted in space-division multiplexing, or frequency-division multiplexing, or time-division multiplexing. M SRS resource sets configured by the base station may be replaced with M SRS resource groups in one SRS resource set. The SRS resources included in the M SRS resources do not repeat or overlap with each other. M is an integer greater than 1. In an embodiment, the value of M is 2. For example, one SRS resource set includes SRS resource i, where i=0, 1, 2, 3. SRS resource 0 and SRS resource 1 are grouped into one group, and SRS resource 2 and SRS resource 3 are grouped into one group. The method in the present application may also be applied to uplink physical control channels.

The method for transmitting signaling information provided by the present application can be used in multi-panel or multi-TRP transmission, thereby improving the system performance. As shown in FIG. 1, a method for transmitting signaling information provided by the present application includes S110 and S120.

In S110, the signaling information is received.

To determine the channel state information of the uplink channel in multi-TRP and multi-panel transmission, the communication node in this embodiment, that is, the terminal, receives the signaling information configured by the base station. The signaling information is configured to indicate the channel state information of the M physical uplink channels. M is a positive integer greater than 1.

The signaling information may include M pieces of downlink control information respectively indicating the channel state information of the M physical uplink channels. The signaling information may also include two levels of downlink control information indicating M physical uplink channels. The two levels of downlink control information include one piece of first-level downlink control information and (M−1) pieces of second-level downlink control information. If content included in the (M−1) pieces of second-level downlink control information is empty, the second-level downlink control information having the empty content may not be transmitted. The signaling information may include one piece of downlink control information, and the one piece of downlink control information includes M SRI values, and each SRI value corresponds to one physical uplink channel. Alternatively, the one piece of downlink control information includes M groups of SRIs, and each group of SRIs corresponds to one physical uplink channel.

Exemplarily, the SRI information corresponding to two repetition PUSCHs is indicated through DCI information.

Manner one is through two pieces of DCI. That is, DCI0 and DCI1 indicate SRI0 of PUSCH0 and SRI1 of PUSCH1, respectively.

After receiving SRI0 and SRI1, the terminal may determine whether the SRI is of PUSCH0 or PUSCH1 by a measure of information bundling. For example, DCI0 that transmits SRI0 carries the following information, such as the RV, BWP value, resource allocation value, component carrier (CC) value, and demodulation reference signal (DMRS) value. The SRS resource set corresponding to the SRI includes the panel ID information. Alternatively, $i^{th}$ PDCCH information corresponding to the DCI is bundled to PUSCHi, and i=1, 2. The PDCCH information includes the CORESET, SS, SS set, PDCCH detection occasion, and PDCCH detection candidate corresponding to the PDCCH.

Manner two is through two levels of DCI including the first-level DCI and the second-level DCI. When the value of the first-level DCI is less than A, it represents that there is only one SRI. If the value of the first-level DCI is greater than A, the second-level DCI is initiated. The second-level DCI indicates the PMI, RI and other information of the PUSCH. A is a positive integer, and the value of A may be set according to the actual situation.

Manner three is through one DCI to indicate. The SRI table indicated by the DCI needs to be expanded to include two SRI values (or two groups of SRI values). The two SRI values (or two groups of SRI values) correspond to the first PUSCH and the second PUSCH, respectively.

In S120, the channel state information of the M physical uplink channels is determined based on the signaling information.

After receiving the signaling information, the communication node, that is, the terminal, may determine the channel state information of the M physical uplink channels based on the channel state information of the M physical uplink channels indicated by the signaling information. The determination strategy may be determined according to the indication measure of the signaling information, which is not limited here.

The method for transmitting signaling information provided by the present application receives signaling information firstly. The signaling information is configured to indicate the channel state information of the M physical uplink channels. Then the channel state information of the M physical uplink channels is determined based on the signaling information. The method effectively determines the channel state information of the plurality of physical uplink channels through the signaling information in multi-TRP and multi-panel transmission.

On the basis of the above embodiment, variant embodiments of the above embodiment are proposed, for the brevity of description, only differences from the above embodiment will be described in the variant embodiments.

In one embodiment, the association between an uplink sounding reference signal resource set and the field value set of the downlink control information indicates the channel state information of the M physical uplink channels.

In one embodiment, the field value set of the downlink control information is M field value sets divided by values of at least one of the following fields of the downlink control information: a redundancy version field, a carrier indicator field, a bandwidth part indicator field, or an antenna port field.

In one embodiment, determining the channel state information of the M physical uplink channels based on the signaling information includes at least one of the following:

determining the channel state information of the M physical uplink channels based on the association between the uplink sounding reference signal resource set and a redundancy version field value set of the downlink control information; determining the channel state information of the M physical uplink channels based on the association between the uplink sounding reference signal resource set and a carrier indicator field value set of the downlink control information; determining the channel state information of the M physical uplink channels based on the association between the uplink sounding reference signal resource set and a bandwidth part indicator field value set of the downlink control information; or determining the channel state information of the M physical uplink channels based on the association between the uplink sounding reference signal resource set and an antenna port field value set of the downlink control information. For example, the channel state information of the M physical uplink channels is determined according to the association between the uplink sounding reference signal resource set and the redundancy version field value set of the downlink control information.

Exemplarily, in a case where the base station configures the signaling information, the signaling information may include M pieces of downlink control information (DCI). Therefore, the signaling information received by the terminal includes the M pieces of downlink control information (DCI). The M (M is an integer greater than 1) pieces of DCI indicate CSI (including, but not limited to, at least one of the SRI, TPMI, RI, or MCS, where TPMI and RI may be jointly coded to be indicated together through the precoding and number of layers) of PUSCHs transmitted by M panels, which is implemented through bundling of an SRS resource set with values of one or more fields in the DCI.

In the system of this embodiment, one terminal and at least two TRPs (or two panels in one TRP) are included, and the terminal includes at least two panels. M panels indicated by M pieces of DCI respectively transmit M PUSCHs, and the transmission of each PUSCH is the repetition transmission. The PUSCH in this embodiment may be replaced with the PUCCH.

This embodiment is mainly used for explaining how the base station indicates the CSI respectively corresponding to the M PUSCHs through the M pieces of DCI, and how the terminal determines, according to the received DCI, which panel transmits the PUSCHs respectively corresponding to the M pieces of CSI. M is an integer greater than 1.

For the base station, the following may be performed.

(1) The base station configures M SRS resource sets, and each SRS resource set includes K SRS resources.

M SRS resource sets are bundled to a value of at least one of redundancy version field, the carrier indicator field, the bandwidth part indicator field, or the antenna port field of DCI.

For the value of the redundancy version field, the RVs after the uplink transmission data channel is encoded are divided into M version sets, RV seti, where i=0, ..., M−1. For example, when M=2, RV set0 includes RV versions of {0, 2}, and RV set1 includes versions of {1, 3}. The division of the RV version sets may be other values agreed by the base station and the terminal, such as {0, 1} and {2, 3}.

For the value of the carrier indicator, for example, the values of the carrier indicators are divided into M sets, CI seti, where i=0, ..., M−1. For example, when M=2, CI set0 includes values of {0, 2}, and CI set1 includes values of {1, 3}. Similarly, there may be another value grouping manner.

For the bandwidth part indicator, for example, the values of the BWPI are divided into M sets, BWPI seti, and i=0, ..., M−1. For example, when M=2, BWPI set0 includes values of {0, 2}, and BWPI set1 includes values of {1, 3}. There may be another value grouping manner.

Antenna ports mainly refer to the DMRS. The values of the antenna port field are divided into M sets, DMRS seti, where i=0, ..., M−1, for example, when M=2, DMRS set0 includes values of {0, ..., L/2}, and DMRS set1 includes values of {L/2+1, ..., L−1}. There may be another value grouping manner. L is a positive integer indicating the number of elements in the DMRS port set.

At least one of the RV seti, CI seti, BWPI seti, or DMRS seti is bundled to the SRS resource set i. In a case where the value of the corresponding field in $i^{th}$ DCI is a value in the set of at least one of the RV seti, CI seti, BWPI seti, or DMRS seti, the value of the CSI carried by the $i^{th}$ DCI corresponds to an $i^{th}$ PUSCH or the CSI of the PUSCH transmitted by an $i^{th}$ panel, and i=0, ..., M−1. The $i^{th}$ SRS resource set is bundled to an $i^{th}$ uplink transmission unit (such as a panel).

(2) The base station receives the M SRS resource sets transmitted by the terminal and estimates an optimal CSI value for each SRS resource set.

For example, the base station, through receiving an $i^{th}$ SRS resource set, determines that the optimal CSI value of the $i^{th}$ SRS resource set is CSIi. The CSIi includes at least one of the SRI, TPMI, RI, or MCS, and i=0, ..., M−1.

(3) The base station transmits the M pieces of CSI, CSIi, through M pieces of DCI, where i=0, ..., M−1.

The M pieces of DCI satisfy at least one of the following: the value of the redundancy version field of $i^{th}$ DCI from RV seti, the value of the carrier indicator field of the $i^{th}$ DCI from CI seti, the value of the bandwidth part indicator field of the $i^{th}$ DCI from BWPI seti, or the value of the DMRS of the $i^{th}$ DCI from DMRS seti, and i=0, ..., M−1.

The terminal performs the following.

(1) M SRS resource sets configured by the base station are received.

(2) SRS resources are transmitted according to the configuration of the M SRS resource sets.

(3) M pieces of DCI transmitted by the base station are received, and M pieces of CSI, CSIi, are acquired. i=0, ..., M−1.

In at least one of the following cases: the value of the redundancy version field in the $i^{th}$ DCI from the RV seti, the value of the carrier indicator field in the $i^{th}$ DCI from the CI seti, the value of the bandwidth part indicator field in the $i^{th}$ DCI from the BWPI seti, or the value of the antenna port field in the $i^{th}$ DCI from the DMRS seti, it may be determined that the value of the CSIi carried by the $i^{th}$ DCI corresponds to the PUSCHi of the $i^{th}$ panel. The values of the CSI may be used for determining at least one of the following information used for transmitting the PUSCHi: spatial parameter information (such as a transmit beam), the number of layers, the precoding matrix information, or the MCS. The precoding matrix information and the number of layers may be notified jointly through one piece of precoding information and number of layers.

In this embodiment, in a case where the CSI indicated by the base station includes the TPMI information, the configurations of codebook restriction (i.e., codebookSubset) in the codebook configurations corresponding to the TPMIs indicated by the M pieces of DCI are independent. The values of codebookSubset include fullyAndPartialAndNonCoherent, partial AndNonCoherent, and nonCoherent. The fullyAndPartialAndNonCoherent, partialAndNonCoherent, and nonCoherent correspond to three configurations of codebook restriction. fullyAndPartialAndNonCoherent includes all codebooks that are fully coherent, partially coherent, and non-coherent, partialAndNonCoherent corresponds to partially coherent and non-coherent codebooks, and the non-Coherent only corresponds to non-coherent codebooks.

M SRS resource sets in this embodiment may also be replaced with a plurality of SRS resource groups of one SRS resource set.

In one embodiment, the association between the uplink transmission unit and the physical downlink control channel information set corresponding to the downlink control information indicates channel state information of the M physical uplink channels.

In one embodiment, the physical downlink control channel information set is formed by a value of at least one of the following information:

a component carrier for transmitting a physical downlink control channel, a bandwidth part for transmitting a physical downlink control channel, a control resource set in which a physical downlink control channel is located, a physical downlink control channel detection occasion, or a physical downlink control channel detection candidate.

In one embodiment, determining the channel state information of the M physical uplink channels based on the signaling information includes at least one of the following:

determining the channel state information of the M physical uplink channels based on the association between the uplink transmission unit and the component carrier value set for transmission of a physical downlink control channel; determining the channel state information of the M physical uplink channels based on the uplink transmission unit and the association between a bandwidth part value set for transmission of a physical downlink control channel; determining the channel state information of the M physical uplink channels based on the association between the uplink transmission unit and the control resource set value set corresponding to the downlink control information; determining the channel state information of the M physical uplink channels based on the association between the uplink transmission unit and the physical downlink control channel detection occasion value set corresponding to the downlink control information; or determining the channel state information of the M physical uplink channels based on the association between the uplink transmission unit and the physical downlink control channel detection candidate value set corresponding to the downlink control information. For example, the channel state information of the M physical uplink channels is determined according to the association between the uplink transmission unit and the component carrier value set for transmission of the physical downlink control channel.

Exemplarily, in a case where the base station configures the signaling information, the signaling information may include M pieces of downlink control information. M (M is an integer greater than 1) pieces of DCI indicate the CSI (including, but not limited to, at least one of the SRI, TPMI, RI, or MCS, where the TPMI and RI may be jointly coded to be indicated together through the precoding and the number of layers) of PUSCHs transmitted by M panels, which is implemented through resources for transmitting the PDCCH. The resources for transmitting the PDCCH include, but are not limited to, BWPs and CCs.

In the system of this embodiment, one terminal and at least two TRPs (or two panels in one TRP) are included, and the terminal includes at least two panels. M panels indicated by M pieces of DCI respectively transmit M PUSCHs, and the transmission of each PUSCH is the repetition transmission.

This embodiment is mainly used for explaining how the base station indicates the CSI respectively corresponding to the M PUSCHs through M pieces of DCI, and how the terminal determines, according to the received DCI, which panel transmits PUSCHs respectively corresponding to the M pieces of CSI. M is an integer greater than 1. This example may also be applied to the PUCCH.

For the base station, the following may be performed.

(1) The base station configures M SRS resource sets, and each SRS resource set includes K SRS resources.

(2) The base station receives the M SRS resource sets transmitted by the terminal and estimates an optimal CSI value for each SRS resource set.

For example, the base station, through receiving an $i^{th}$ SRS resource set, determines that the optimal CSI value of the $i^{th}$ SRS resource set is CSIi. The CSIi includes at least one of the SRI, TPMI, RI, or MCS, and i=0, ..., M−1.

(3) The base station transmits the M pieces of CSI, CSIi, through M pieces of DCI, and i=0, ..., M−1.

The base station divides the resources for transmitting the DCI into M resource groups, and each resource group is bundled to one uplink transmission unit (for example, a panel). For example, at least one of the following resources, such as carriers, and bandwidth parts, for transmitting the DCI are divided into M resource groups.

For the carriers, the values of component carriers for transmitting the DCI are divided into M sets, CC seti, where i=0, ..., M−1. For example, when M=2, CC set0 includes values of {0, 2}, and CC set1 includes values of {1, 3}. Similarly, there may be another value grouping manner.

For the bandwidth parts, for example, the values of BWPs for transmitting the DCI are divided into M sets, BWP seti, where i=0, ..., M−1. For example, when M=2, BWP set0 includes values of {0, 2}, and BWP set1 includes values of {1, 3}. There may be another value grouping manner.

When the value of a carrier for transmitting $i^{th}$ DCI is from at least one of CC seti or BWP seti, it represents that the value of CSI carried by the $i^{th}$ DCI corresponds to an $i^{th}$ PUSCH or the CSI of a PUSCH transmitted by an $i^{th}$ panel, and i=0, ..., M−1.

The terminal performs the following.

(1) M SRS resource sets configured by the base station are received.

(2) SRS resources are transmitted according to the configuration of the M SRS resource sets.

(3) M pieces of DCI transmitted by the base station are received, and M pieces of CSI, CSIi, are acquired. i=0, ..., M−1.

When the value of the carrier used for receiving $i^{th}$ DCI is from the CC seti, or when the value of the BWP for receiving the $i^{th}$ DCI is from the BWP seti, it may be determined that the value of the CSIi carried in the $i^{th}$ DCI corresponds to a PUSCHi of an $i^{th}$ panel. The value of the CSI may be configured to determine at least one of the following information for transmitting the PUSCHi: spatial parameter information (such as a transmit beam), the number of layers, the precoding matrix information, or the MCS. The precoding information and the number of layers may be notified jointly through one piece of precoding information and number of layers.

In this embodiment, if the CSI indicated by the base station includes the TPMI, the configurations of codebook restriction in the codebook configurations corresponding to the TPMIs indicated by M pieces of DCI are independent.

M SRS resource sets in this embodiment may be replaced with a plurality of SRS resource groups of one SRS resource set.

Exemplarily, in a case where the signaling information is configured, the signaling information may include M pieces of downlink control information. The M pieces of DCI indicate CSI (including, but not limited to, at least one of the SRI, TPMI, RI, or MCS, where the TPMI and RI may be jointly coded to be indicated together through the precoding and number of layers) of PUSCHs transmitted by M panels, which is implemented through information of the PDCCH. The information of the PDCCH includes, but is not limited to, the CORESET group, SS, occasion, and candidate corresponding to the PDCCH.

In the system of this embodiment, one terminal and at least two TRPs (or two panels in one TRP) are included, and the terminal includes at least two panels. M panels indicated by M pieces of DCI respectively transmit M PUSCHs, and the transmission of each PUSCH is the repetition transmission. This example may also be applied to the PUCCH.

This example is used for explaining how the base station indicates the CSI respectively corresponding to the M PUSCHs through M pieces of DCI, and how the terminal determines, according to the received DCI, which panel transmits PUSCHs respectively corresponding to the M pieces of CSI. M is an integer greater than 1.

For the base station, the following may be performed.

(1) The base station configures M SRS resource sets, and each SRS resource set includes K SRS resources.

(2) The base station receives the M SRS resource sets transmitted by the terminal and estimates an optimal CSI value for each SRS resource set.

For example, the base station, through receiving an $i^{th}$ SRS resource set, determines that the optimal CSI value of the $i^{th}$ SRS resource set is CSIi. The CSIi includes at least one of the SRI, TPMI, RI, or MCS, and i=0, ..., M−1.

(3) The base station transmits M pieces of CSI, CSIi, through M pieces of DCI, and i=0, ..., M−1.

The base station divides the PDCCH information carrying the DCI into M PDCCH information groups, and each PDCCH information group is bundled to one uplink transmission unit (for example, a panel). For example, at least one of the following information of the PDCCH is divided into M PDCCH information groups: the CORESET, SS, SSSET, occasion, or candidate.

The control resource sets configured for the terminal are divided into M groups, CORESET seti, where i=0, . . . , M−1. For example, when M=2, CORESET set0 includes CORESET ID values of {0, 2}, and CORESET set1 includes a CORESET ID value of {3}. Similarly, there may be another value grouping manner. CORESET is the control resource set for transmission of the PDCCH, and CORESET ID is the identifier of the control resource set.

The search spaces (SSs) configured for the terminal are divided into M groups, SS seti, and i=0, . . . , M−1. For example, when M=2, SS set0 includes SSs corresponding to SS ID values of {0, 1, 2, 3, 4}, and SS set1 includes SSs corresponding to SS ID values of {5, 6, 7, 8, 9, 10}. Similarly, there may be another value grouping manner. SS ID is the identifier of the search space.

The search space sets (SSSETs) configured for the terminal are divided into M groups, SSSET seti, and i=0, . . . , M−1. For example, when M=2, SSSET set0 includes SSSETs corresponding to SSSET ID values of {0, 1, 2, 3, 4}, and SSSET set1 includes SSSETs corresponding to SSSET ID values of {5, 6, 7, 8, 9, 10}. Similarly, there may be another value grouping manner. SSSET ID is the identifier of the search space set.

The occasions for detecting the PDCCH and configured for the terminal are divided into M groups, occasion seti, and i=0, . . . , M−1. For example, when M=2, occasion set0 includes occasion values of {0, 1, 2, 3, 4}, while occasion set1 includes occasion values of {5, 6, 7, 8, 9, 10}. Of course, there are other grouping manners.

The candidates for detecting the PDCCH and configured for the terminal are divided into M groups, candidate seti, and i=0, . . . , M−1. For example, when M=2, candidate set0 includes candidate values of {0, 1}, and candidate set1 includes candidate values of {2, 3}. Of course, there are other grouping manners.

When one of the following conditions is satisfied by the PDCCH information for transmitting the $i^{th}$ DCI. the value of the control resource set is from CORESET seti, the value of the search space is from SS Seti, the value of the search space set is from SSSET Seti, the value of the PDCCH detection occasion is from occasion Seti, or the value of the PDCCH detection candidate is from candidate Seti, it represents that the value of the CSI carried by the $i^{th}$ DCI corresponds to an $i^{th}$ PUSCH or the CSI of a PUSCH transmitted by an $i^{th}$ panel, and i=0, . . . , M−1.

The terminal performs the following.

(1) M SRS resource sets configured by the base station are received.

(2) SRS resources are transmitted according to the configuration of the M SRS resource sets.

(3) M pieces of DCI transmitted by the base station are received, and M pieces of CSI, CSIi, are acquired. i=0, . . . , M−1.

When one of the following conditions is satisfied by the PDCCH information for transmitting the $i^{th}$ DCI. the value of the control resource set is from CORESET seti, the value of the search space is from SS Seti, the value of the search space set is from SSSET Seti, the value of the PDCCH detection occasion is from occasion Seti, or the value of the PDCCH detection candidate is from candidate Seti, it represents that the value of the CSI carried by $i^{th}$ DCI corresponds to an $i^{th}$ PUSCH or the CSI of a PUSCH transmitted by an $i^{th}$ panel, where i=0, . . . , M−1. The value of the CSI may be configured to determine at least one of the following information for transmitting the PUSCHi: spatial parameter information (such as a transmit beam), the number of layers, the precoding matrix information, or the MCS. The precoding information and the number of layers may be notified jointly through one piece of the precoding information and number of layers.

In this embodiment, if the CSI indicated by the base station includes the TPMI, the configurations of codebook restriction in the codebook configurations corresponding to the TPMIs indicated by M pieces of DCI are independent.

M SRS resource sets in this embodiment may be replaced with a plurality of SRS resource groups of one SRS resource set.

In one embodiment, determining the channel state information of the M physical uplink channels based on the signaling information includes determining the channel state information of the M physical uplink channels based on an uplink transmission unit index of an uplink sounding reference resource or an uplink sounding reference resource set indicated by an uplink sounding reference resource indicator field of the signaling information. That is, the channel state information of the M physical uplink channels is determined according to the uplink transmission unit index of the uplink sounding reference resource or the uplink sounding reference resource set indicated by the uplink sounding reference resource indicator field of the signaling information.

Exemplarily, in a case where the signaling information is configured, the signaling information may include M pieces of downlink control information. The M pieces of DCI indicate the CSI (including, but not limited to, at least one of the SRI, TPMI, RI, or MCS, where the TPMI and RI may be jointly coded to be indicated together through the precoding and number of layers) of PUSCHs transmitted by M panels, which is implemented through panel ID information included in SRS resource sets or SRS resources.

In the system of this embodiment, one terminal and at least two TRPs (or two panels in one TRP) are included, and the terminal includes at least two panels. M panels indicated by M pieces of DCI respectively transmit M PUSCHs, and the transmission of each PUSCH is the repetition transmission. The method of this embodiment may also be applied to the PUCCH.

This example is used for explaining how the base station indicates the CSI respectively corresponding to the M PUSCHs through M pieces of DCI, and how the terminal determines, according to the received DCI, which panel transmits PUSCHs respectively corresponding to the M pieces of CSI. M is an integer greater than 1.

For the base station, the following may be performed.

(1) The base station configures M SRS resource sets, and each SRS resource set includes K SRS resources.

Each SRS resource includes an index identifying an uplink transmission unit, such as panelId included in the field of the SRS resource configured in higher layer signaling. In this manner, the selected SRS resource is known to be applied to which panel according to the selected SRS ID. For example, the index (panelId) of the uplink transmission unit is added into the SRS resource configured in the higher layer signaling, and the value of the index is an integer from 0 to M−1.

```
For example, SRS-Resource ::=    SEQUENCE {
  srs-ResourceId                 SRS-ResourceId,
  panelId                        INTEGER (0... M − 1),
  ...
}
```

Alternatively, the SRS resource set includes the index (panelId) of the uplink transmission unit. For example, the field of the SRS resource set configured in the higher layer signaling includes the index (panelId) of the uplink transmission unit, and the value of the index is an integer from 0 to M−1.

```
For example, SRS-ResourceSet ::=     SEQUENCE {
    srs-ResourceSetId                SRS-ResourceSetId,
    panelId                          INTEGER (0... M − 1),
    ...
}
```

(2) The base station receives the M SRS resource sets transmitted by the terminal and estimates an optimal CSI value for each SRS resource set.

For example, the base station receives an $i^{th}$ SRS resource set, the corresponding panelId included in the higher layer signaling of the $i^{th}$ SRS resource set is equal to i, or the panelId included in the SRS resource included in the $i^{th}$ SRS resource set is equal to i, and the base station determines that the optimal CSI value of the $i^{th}$ SRS resource set is CSIi, and i=0, . . . , M−1.

(3) The base station transmits M pieces of CSI, CSIi, through M pieces of DCI, and i=0, . . . , M−1.

The terminal performs the following.

(1) M SRS resource sets configured by the base station are received.

(2) SRS resources are transmitted according to the configuration of the M SRS resource sets.

(3) M pieces of DCI transmitted by the base station are received, and the values of M pieces of CSI, CSIi, are acquired. i=0, . . . , M−1.

The terminal receives an SRIi (or SRIi group) of the SRS indicator field of $i^{th}$ DCI, and uses the SRIi (or SRIi group) to check the corresponding value of panelId included in the SRS resource or the SRS resource set configured in the higher layer signaling, so as to determine to which panel the SRIi corresponds, thus determining to which panel the CSIi carried by the DCI is applied. Moreover, the panel transmits the PUSCH using at least one of the following parameters corresponding to the CSIi: spatial parameter information (such as a transmit beam), the number of layers, the precoding matrix information, or the MCS. The precoding matrix information and the number of layers may be notified jointly through one piece of the precoding information and number of layers.

In this embodiment, if the CSI indicated by the base station includes the TPMI, the configurations of codebook restriction in the codebook configurations corresponding to the TPMIs indicated by M pieces of DCI are independent.

M SRS resource sets in this embodiment may also be replaced with a plurality of SRS resource groups of one SRS resource set.

In one embodiment, the signaling information includes the first-level downlink control information. The first-level downlink control information is configured to determine the channel state information of the first physical uplink channel.

The first physical uplink channel may be any one of the M physical uplink channels, such as the first physical uplink channel. In an embodiment, the signaling information may include the second-level downlink control information, that is, the signaling information may include two levels of downlink control information: the first-level downlink control information and the second-level downlink control information.

In one embodiment, determining the channel state information of the M physical uplink channels based on the signaling information includes at least one of the following: determining content of the second-level downlink control information according to the uplink sounding signal resource indicator field of the first-level downlink control information; or determining detection status of the second-level downlink control information according to the uplink sounding signal resource information indicated in the first-level downlink control information. The second-level downlink control information belongs to the M pieces of downlink control information.

The first-level downlink control information may be configured to determine at least one of the content of the second-level downlink control information included in the signaling information or the detection status of the second-level downlink control information. The detection status may be understood as whether to detect the second-level downlink control information.

In one embodiment, determining the channel state information of the M physical uplink channels based on the signaling information includes at least one of the following: in a case where the number of uplink sounding signal resource groups or the number of uplink sounding signal resources indicated by the first-level downlink control information is less than a predetermined value, not detecting the second-level downlink control information; in a case where the number of uplink sounding signal resource groups or the number of uplink sounding signal resources indicated by the first-level downlink control information is less than the predetermined value, determining that the content of the second-level downlink control information is empty; in a case where the number of uplink sounding signal resource groups or the number of uplink sounding signal resources indicated by the first-level downlink control information is greater than or equal to the predetermined value, detecting the second-level downlink control information; in a case where the number of uplink sounding signal resource groups or the number of uplink sounding signal resources indicated by the first-level downlink control information is greater than or equal to the predetermined value, determining that the content of the second-level downlink control information is not empty; or in a case where the number of uplink sounding signal resource groups or the number of uplink sounding signal resources indicated by the first-level downlink control information is greater than or equal to the predetermined value, determining that the second-level downlink control information includes the channel state information of the second physical uplink channel.

In the process of determining the channel state information of the M physical uplink channels based on signaling information, the content of the second-level downlink control information may be determined based on the uplink sounding signal resource indicator field of the first-level downlink control information, that is, the content of the second-level downlink control information may be determined according to the number of uplink sounding signal resource groups or the number of uplink sounding signal resources indicated by the first-level downlink control information. In the process of determining the channel state information of the M physical uplink channels based on signaling information, the detection status of the second-level downlink control information may be determined according to the uplink sounding signal resource information indicated by the first-level downlink control information, that is, the detection status of the second-level downlink control information may be determined according to the number of uplink sounding signal resource groups or the number of uplink sounding signal resources indicated by the first-level downlink control information. The predetermined value may be a positive integer, such as 1.

In one embodiment, determining the content of the second-level downlink control information according to the uplink sounding signal resource indicator field of the first-level downlink control information includes at least one of the following: in a case where the number of uplink sounding signal resources indicated by the first-level downlink control information or the number of uplink sounding signal resource groups indicated by the first-level downlink control information is less than the predetermined value, determining that the content of the second-level downlink control information is empty; in a case where the number of uplink sounding signal resources indicated by the first-level downlink control information or the number of uplink sounding signal resource groups indicated by the first-level downlink control information is greater than or equal to the predetermined value, determining that the content of the second-level downlink control information is not empty; or in a case where the number of uplink sounding signal resources indicated by the first-level downlink control information or the number of uplink sounding signal resource groups indicated by the first-level downlink control information is greater than or equal to the predetermined value, determining that the second-level downlink control information includes the channel state information of the second physical uplink channel.

In one embodiment, the detection status of the second-level downlink control information may be determined according to the uplink sounding signal resource information indicated in the first-level downlink control information includes at least one of the following: in a case where the number of uplink sounding signal resources indicated by the first-level downlink control information or the number of uplink sounding signal resource groups indicated by the first-level downlink control information is less than the predetermined value, not detecting the second-level downlink control information; or in a case where the number of uplink sounding signal resources indicated by the first-level downlink control information or the number of uplink sounding signal resource groups indicated by the first-level downlink control information is greater than or equal to the predetermined value, detecting the second-level downlink control information.

In a case where the uplink sounding signal resource indicator field of the downlink control information indicates one uplink sounding signal resource indicator or one uplink sounding signal resource indicator group, the content of the second-level downlink control information is empty. Alternatively, in a case where the uplink sounding signal resource indicator field of the downlink control information indicates at least one uplink sounding signal resource indicator or at least one uplink sounding signal resource indicator group, the content of the second-level downlink control information includes the channel state information for indicating the second physical uplink channel.

The uplink sounding signal resource indicator may be for the codebook transmission mode of uplink transmission. The uplink sounding signal resource indicator group may be for the non-codebook transmission mode of uplink transmission.

The second physical uplink channel may be understood as an uplink channel other than the physical uplink channel indicated by the first-level downlink control channel among the M physical uplink channels.

Exemplarily, the signaling information includes two levels of DCI. The two levels of DCI indicate the CSI (including, but not limited to, at least one of the SRI, TPMI, RI, or MCS, where TPMI and RI may be jointly coded to indicate together through the precoding and number of layers) of M panels, which is implemented through two levels of PDCCHs.

In the system of this embodiment, one terminal and at least two TRPs (or two panels in one TRP) are included, and the terminal includes at least two panels. M panels indicated by M pieces of DCI respectively transmit M PUSCHs, and the transmission of each PUSCH is the repetition transmission.

This example is used for explaining how the base station indicates the CSI respectively corresponding to the M PUSCHs through two levels of DCI, and how the terminal determines, according to the received DCI, which panel transmits PUSCHs respectively corresponding to the M pieces of CSI. M is an integer greater than 1.

For the base station, the following may be performed.

(1) The base station configures M SRS resource sets, and each SRS resource set includes K SRS resources.

(2) The base station receives the M SRS resource sets transmitted by the terminal and estimates an optimal CSI value for each SRS resource set.

For example, the base station, through receiving an $i^{th}$ SRS resource set, determines that the optimal CSI value of the $i^{th}$ SRS resource set is CSIi. The CSIi includes at least one of the SRI, TPMI, RI, or MCS, and i=0, . . . , M−1.

(3) The base station transmits the M pieces of CSI, CSIi, in the two-level manner, and i=0, . . . , M−1.

To facilitate the two levels of DCI to transmit the M pieces of CSI, such as the SRI in the CSI, the SRS table corresponding to the SRS indicator field in the DCI is expanded.

For the codebook-based transmission scheme, Table A1 is an expanded table. One possible expansion is to expand the table into Table A1 below, with the expanded part underlined. In this example, there are 2 panels in total, and each panel is configured with 2 resources.

TABLE A1

| Expanded table | |
| --- | --- |
| Bit Field Mapped to Index | SRI(s) |
| 0 | 0 |
| 1 | 1 |
| 2 | 0; 1 |
| 3 | Reserve |

For the codebook-based transmission scheme, Table A2 is another expanded table. One possible expansion is to expand the table into Table A2 below, with the expanded part underlined. The expanded part includes at least two SRI values. One SRI value on the left of the semicolon and one SRI value on the right of the semicolon respectively correspond to the CSI of PUSCHs transmitted by two uplink transmission units. The SRI is configured to indicate the SRS resource index (or indicator) in the SRS resource set. In this example, there are 2 panels in total, and each panel is configured with 2 resources. The semicolon may also have other representations, such as parentheses, line feed, slashes, and the like, as long as it can be used for dividing the indexes into a plurality of groups.

TABLE A2

Another expanded table

| Bit Field Mapped to Index | SRI(s) |
|---|---|
| 0 | 0 |
| 1 | 1 |
| 2 | 2 |
| 3 | 3 |
| 4 | 0; 2 |
| 5 | 0; 3 |
| 6 | 1; 2 |
| 7 | 1; 3 |

For the non-codebook-based transmission scheme, Table 3 is another extension table. One possible expansion is to expand the table into Table A3 below, with the expanded part underlined. The expanded part includes at least two groups of SRI values. One group of SRI values on the left of the semicolon and one group of SRI values on the right of the semicolon respectively correspond to the CSI of PUSCHs transmitted by two uplink transmission units. Each group of SRI values may include at least one SRI value. The semicolon may also have other representations, such as parentheses, line feed, slashes, and the like, as long as it can be used for dividing the indexes into a plurality of groups. In this example, there are 2 panels in total, and each panel is configured with 2 to 4 resources.

TABLE A3

Another expanded table

| Bit Field Mapped to Index | SRI(s), $M_{SRS} = 2$ | Bit Field Mapped to Index | SRI(s), $M_{SRS} = 3$ | Bit Field Mapped to Index | SRI(s), $M_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | 0; 1 | 3 | 0, 1 | 3 | 3 |
|   |   | 4 | 0, 2 | 4 | 0, 1 |
|   |   | 5 | 1, 2 | 5 | 0, 2 |
|   |   | 6 | 0; 1 | 6 | 0, 3 |
|   |   | 7 | 0; 2 | 7 | 1, 2 |
|   |   |   |   | 8 | 1, 3 |
|   |   |   |   | 9 | 2, 3 |
|   |   |   |   | 10 | 0; 1 |
|   |   |   |   | 11 | 0; 2 |
|   |   |   |   | 12 | 0; 3 |
|   |   |   |   | 13 | 1; 2 |
|   |   |   |   | 14 | 1; 3 |
|   |   |   |   | 15 | 2; 3 |

The indexes of SRSs indicated in the expanded rows of the expanded tables may have other values and are not specified, as long as the number of SRIs indicated in the rows in Table A1 and Table A2 is greater than 1, the SRIs indicated in the rows in Table A3 include at least two groups of SRIs. The rows in the tables may be exchanged. A table including a row with more than one SRI or two groups of SRIs may be a newly-added table.

In at least one of the following cases: M SRIs (Table A1 or A2) or SRI groups (Table A3) are included in rows of the SRI table indicated by the SRS indicator field in the first-level DCI; M TCI state values (i.e. states) are in the TCI field included in the DCI that schedules the PDSCH; or the base station configures two CORESET groups; it represents that the base station indicates SRS resources of M uplink PUSCHs at the same time, where M is an integer greater than 1. In this case, the base station transmits the second-level DCI. The second-level DCI includes at least one of the TPMI/RI, DMRS, resource allocation, or other information for indicating PUSCHs transmitted by other panels other than PUSCH0 corresponding to the first panel. Otherwise, in a case where one SRI or SRI group is included in the rows in the SRI table indicated by the SRS indicator field in the first-level DCI, the base station does not transmit the second-level DCI, that is, only one panel is used for uplink transmission.

The terminal performs the following.

(1) M SRS resource sets configured by the base station are received.

(2) SRS resources are transmitted according to the configuration of the M SRS resource sets.

(3) Two levels of DCI transmitted by the base station are received, and M pieces of CSI, CSIi, are acquired. i=0, . . . , M−1.

The terminal receives the first-level DCI. In at least one of the following cases: M SRIs (Table A1 or A2) or SRI groups (Table A3) are included in rows in the SRI table indicated by the SRS indicator field in the first-level DCI; M TCI state values are in the TCI field included in the DCI that schedules the PDSCH; or the base station configures two CORESET groups, representing that the base station indicates SRS resources of M uplink PUSCHs at the same time, where M is an integer greater than 1. In this case, the terminal receives the second-level DCI. The second-level DCI includes at least one of the TPMI/RI, DMRS, resource allocation or other information for indicating PUSCHs of other panels other than PUSCH0 corresponding to the first panel. Otherwise, when one SRI (Table A1 or A2) or one SRI group (Table A3) is included in the rows of the SRI table indicated by the SRS indicator field in the first-level DCI, the terminal does not receive the second-level DCI, that is, only one panel is used for uplink transmission. Thus, it is possible to dynamically switch between single-panel transmission and multi-panel joint transmission.

The terminal determines the SRS resource index corresponding to each panel of the uplink transmission according to the information in the first-level DCI, so as to know the spatial parameter information for transmitting the uplink PUSCH, or the transmitted precoding information and number of layers. The information for transmitting the PUSCH, such as the resource allocation information, the PMI information and the like of each panel, may be determined through the second-level DCI. The first-level DCI may carry at least one of the following of the first panel: the PMI; resource allocation information; or DMRS port information.

In this embodiment, if the CSI indicated by the base station includes the TPMI, the configurations of codebook restriction in the codebook configurations corresponding to the TPMIs indicated by the first-level DCI and the second-level DCI are independent.

M SRS resource sets in this embodiment may be replaced with a plurality of SRS resource groups of one SRS resource set.

In one embodiment, the signaling information includes one piece of downlink control information, an uplink sounding signal resource indicator field in the downlink control information indicates M uplink sounding signal resource indicators, and the M uplink sounding signal resource indicators are configured to determine channel state information of the M physical uplink channels. M uplink sounding signal resource indicators are determined according to the uplink sounding signal resource indicator field in the downlink control information.

Exemplarily, the signaling information includes one piece of downlink control information. One piece of DCI indicates the CSI (including, but not limited to, at least one of the SRI, TPMI, RI, or MCS, where the TPMI and RI may be jointly coded to be indicated together through the precoding and number of layers) of PUSCHs transmitted by M panels, and the codebook-based transmission mode is adopted during uplink transmission.

In the system of this embodiment, one terminal and at least two TRPs (or two panels in one TRP) are included, and the terminal includes at least two panels. M panels indicated by one piece of DCI respectively transmit M PUSCHs, and the transmission of each PUSCH is the repetition transmission. This embodiment may also be applied to the PUCCH.

This example is used for explaining how the base station indicates the CSI respectively corresponding to the M PUSCHs through one piece of DCI, and how the terminal determines, according to the received DCI, which panel transmits PUSCHs respectively corresponding to the M pieces of CSI. M is an integer greater than 1.

For the base station, the following may be performed.

(1) The base station configures M SRS resource sets, and each SRS resource set includes K SRS resources. M and K are integers greater than 1, such as M=2, and K=2.

(2) The base station receives the M SRS resource sets transmitted by the terminal and estimates an optimal CSI value for each SRS resource set.

For example, the base station, through receiving an $i^{th}$ SRS resource set, determines that the optimal CSI value of the $i^{th}$ SRS resource set is CSIi. The CSIi includes at least one of the SRI, TPMI, RI, or MCS, and i=0, . . . , M−1.

(3) The base station transmits M pieces of CSI, CSIi, through one piece of DCI, and i=0, . . . , M−1.

To facilitate the one piece of DCI to transmit the M pieces of CSI, such as transmitting the SRI in the CSI, the SRS table corresponding to the SRS indicator field in the DCI is redesigned, such as adding one new table.

One possible expansion is to expand the table into Table B1 below. Table B1 is another expanded table, with the expanded part underlined. The expanded part includes at least two SRI values. One SRI value on the left of the semicolon and one SRI value on the right of the semicolon respectively correspond to the CSI of PUSCHs transmitted by two uplink transmission units. The SRI is used for indicating an SRS resource index (or indicator) in the SRS resource set. In this example, there are 2 panels in total, and each panel is configured with 2 resources.

TABLE B1

Another expanded table

| Bit Field Mapped to Index | SRI(s) |
|---|---|
| 0 | 0 |
| 1 | 1 |
| 2 | 0; 1 |
| 3 | 1; 0 |

For the codebook-based transmission scheme, one possible expansion is to expand the table into Table B2 below, and Table B2 is another expanded table, with the expanded part underlined. The expanded part includes at least two SRI values. One SRI value on the left of the semicolon and one SRI value on the right of the semicolon respectively correspond to the CSI of PUSCHs transmitted by two uplink transmission units. The SRI is used for indicating an SRS resource index (or indicator) in the SRS resource set. In this example, there are 2 panels in total, each panel is configured with 2 resources. The semicolon may also have other representations, such as parentheses, line feed, slashes, and the like, as long as it can be used for dividing the indexes into a plurality of groups.

TABLE B2

Another expanded table

| Bit Field Mapped to Index | SRI(s) |
|---|---|
| 0 | 0 |
| 1 | 1 |
| 2 | 2 |
| 3 | 3 |
| 4 | 0; 1 |
| 5 | 1; 0 |
| 6 | 0; 0 |
| 7 | 1; 1 |

Alternatively, one new table as shown in Table B3 below is added, and Table B3 is a newly-added table. Each entry in the table includes at least two SRI values. One SRI value on the left of the semicolon and one SRI value on the right of the semicolon respectively correspond to the CSI of PUSCHs transmitted by two uplink transmission units. The SRI is used for indicating an SRS resource index (or indicator) in the SRS resource set. The semicolon may also have other representations, such as parentheses, line feed, slashes, and the like, as long as it can be used for dividing the indexes into a plurality of groups.

TABLE B3

Newly-added table

| Bit Field Mapped to Index | SRI(s), $M_{SRS}$ = 2 |
|---|---|
| 00 | 0; 0 |
| 01 | 1; 1 |
| 10 | 1; 0 |
| 11 | 1; 1 |

Alternatively, one new table as shown in Table B4 below is added, and Table B4 is another newly-added table.

TABLE B4

Another newly-added table

| Bit Field Mapped to Index | SRI0 value | SRI1 value Offset = 0 | SRI1 value Offset = 1 |
|---|---|---|---|
| 0 | 0 | 0 | 1 |
| 1 | 1 | 1 | 0 |

The indexes of the SRS indicated in an expanded row in the expanded table may have other values and are not specified, as long as the number of SRS resources indicated in the row is greater than 1. The rows in the tables may be exchanged. A table including a row with more than one SRS resource may be a newly-added table.

The base station and the terminal agree on any one of Tables B1 to B4 and make an agreement as follows: if the table is Table B1 or Table B2, in a case where the value of the SRI in Table B1 is less than or equal to 1, or in a case where the value of the SRI in Table B2 is less than 3, it represents that the terminal transmits only one PUSCH, and the SRI corresponds to the transmit beam of the first panel. Otherwise, it represents that the terminal has two repetition PUSCHs to transmit, Panel0 corresponds to the first value of the SRI, and Panel1 corresponds to the second value of the SRI. Thus, it is possible to dynamically switch between the repetition transmission and the non-repetition transmission.

If the table is Table B3, the first value of the SRI corresponds to the transmit beam of the first panel, and the second value of the SRI corresponds to the transmit beam of the second panel. If the table is Table B4, the SRI corresponds to the transmit beam of the first panel, and the value of the SRI of the first panel is determined according to the value of the SRI and the value of the offset. The value of the offset may be indicated through one newly-added offset field of the DCI or may be implicitly indicated through other fields of the DCI. For example, the offset may be determined through the value of the antenna port field (Antenna ports), exemplarily, when the value of the antenna port is in the first port set (e.g. the port index is less than or equal to D, and D is an integer greater than 1), Offset=0; or when the value of the antenna port is in the second port set (e.g. the port index is greater than D), Offset=1. Alternatively, the value of the offset may be determined through the value of the redundancy version field. For example, when the value of the RV is in the first RV set (RV={0, 1}), Offset=0; or when the value of the RV is in the first RV set (RV={0, 1}), Offset=1.

The terminal performs the following.

(1) M SRS resource sets configured by the base station are received.

(2) SRS resources are transmitted according to the configuration of the M SRS resource sets.

(3) One piece of DCI transmitted by the base station is received, and M pieces of CSI, CSIi, are acquired. i=0, . . . , M−1.

The terminal receives the one piece of DCI and determines SRI information of each panel according to a received table configured by the base station.

If the table configured by the base station is Table B1 or B2, in a case where the value of the SRI in Table B1 is less than or equal to 1, or in a case where the value of the SRI in Table B2 is less than 3, it represents that the terminal transmits only one PUSCH, and the SRI corresponds to the transmit beam of the first panel. Otherwise, it represents that the terminal has two repetition PUSCHs to transmit, Panel0 corresponds to the first value of the SRI, and Panel1 corresponds to the second value of the SRI. Thus, it is possible to dynamically switch between the repetition transmission and the non-repetition transmission.

If the table is Table B3, the first value of the SRI corresponds to the transmit beam of the first panel, and the second value of the SRI corresponds to the transmit beam of the second panel. If the table is Table B4, the SRI corresponds to the transmit beam of the first panel, and the value of the SRI of Panel1 is determined according to the value of the SRI and the value of the offset. The value of the offset may be indicated through another newly-added offset field of the DCI or may be implicitly indicated through other fields of the DCI. For example, the offset may be determined through the value of the antenna port field (Antenna ports), exemplarily, when the value of the antenna port is in the first port set (e.g. the port index is less than or equal to D, and D is an integer greater than 1), Offset=0; or when the value of the antenna port is in the second port set (e.g. the port index is greater than D), Offset=1. Alternatively, the value of the offset may be determined through the value of the redundancy version field. For example, when the value of the RV is in the first RV set (RV={0, 1}), Offset=0; or when the value of the RV is in the first RV set (RV={0, 1}), Offset=1.

In this embodiment, if the CSI indicated by the base station includes the TPMI, some new entries need to be added to the table corresponding to the precoding information and the number of layers field. In the precoding indicated in these entries, columns 1 to L1 represent the precoding of the PUSCH transmitted by the first panel, and columns (L1+1) to L represent the precoding of the PUSCH transmitted by the second panel. The first panel correspondingly transmits L1 layers and the second panel correspondingly transmits layers L to L1. L1 may take the value of 1 or 2. L may take the value of 2, 3, or 4, and (L−L1) is greater than 0. For example, in a case where L=2, L1=1, and one panel transmits one layer.

M SRS resource sets in this embodiment may be replaced with a plurality of SRS resource groups of one SRS resource set. The SRI is used for indicating the SRS resource in the SRS resource set selected by the base station, and the transmit beam or precoding for transmission of the PUSCH may be the same as the transmit beam or precoding of the SRS resource indicated by the SRI. Therefore, it may be considered that the SRI indicates the transmit beam or precoding corresponding to the PUSCH.

In one embodiment, the signaling information includes one piece of downlink control information, an uplink sounding signal resource indicator field in the downlink control information indicates M uplink sounding signal resource indicator groups, and the M uplink sounding signal resource indicator groups are configured to determine channel state information of the M physical uplink channels.

Exemplarily, the signaling information includes one piece of downlink control information. The one piece of DCI indicates the CSI (including, but not limited to, the SRI) of PUSCHs transmitted by M panels, and the non-codebook-based transmission mode is adopted during uplink transmission.

In the system of this embodiment, one terminal and at least two TRPs (or two panels in one TRP) are included, and the terminal includes at least two panels. M panels indicated by M pieces of DCI respectively transmit M PUSCHs, and the transmission of each PUSCH is the repetition transmission.

In one embodiment, the channel state information of the physical uplink channels includes a channel rank. The channel rank is acquired according to at least one of the following information: the total number of uplink sounding signal resource indicators indicated by the uplink sounding signal resource indicator field in one piece of downlink control information; or M.

The uplink sounding signal resource indicator is indicated in the uplink sounding signal resource indicator field. The channel rank is the total number of SRIs indicated by the uplink sounding signal resource indicator field divided by the M. That is, the channel rank is the total number of all uplink sounding signal resource indicators (SRIs) indicated by the uplink sounding signal resource indicator field in the downlink control information divided by the M.

This example is used for explaining how the base station indicates the CSI respectively corresponding to the M PUSCHs through one piece of DCI, and how the terminal determines, according to the received DCI, which panel transmits PUSCHs respectively corresponding to the M pieces of CSI. M is an integer greater than 1. For the base station, the following may be performed.

(1) The base station configures M SRS resource sets, and each SRS resource set includes K SRS resources. M and K are integers greater than 1, such as M=2, and K=2.

(2) The base station receives the M SRS resource sets transmitted by the terminal and estimates an optimal CSI value for each SRS resource set.

For example, the base station, through receiving an $i^{th}$ SRS resource set, determines that the optimal CSI value of the $i^{th}$ SRS resource set is CSIi. The CSIi includes at least one of the SRI, TPMI, RI, or MCS, and i=0, ..., M−1.

(3) The base station transmits M pieces of CSI, CSIi, through one piece of DCI, and i=0, ..., M−1.

To facilitate the one piece of DCI to transmit the M pieces of CSI, such as the SRI in the CSI, the SRS table corresponding to the SRS indicator field in the DCI is redesigned, such as adding one new table. One possible expansion is to expand the table into Table C1 below. Table C1 is another expanded table, with the expanded part underlined. The expanded part includes at least two groups of SRI values. One group of SRI values on the left of the semicolon and one group of SRI values on the right of the semicolon respectively correspond to the CSI of PUSCHs transmitted by two uplink transmission units. Each group of SRI values may include at least one SRI value, and one group of SRIs may be referred to as one SRI group.

TABLE C1

Another expanded table

| Bit Field Mapped to Index | SRI(s), $M_{SRS}$ = 2 | Bit Field Mapped to Index | SRI(s), $M_{SRS}$ = 3 | Bit Field Mapped to Index | SRI(s), $M_{SRS}$ = 4 |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| <u>3</u> | <u>0; 1</u> | 3 | 0, 1 | 3 | 3 |
| | | 4 | 0, 2 | 4 | 0, 1 |
| | | 5 | 1, 2 | 5 | 0, 2 |
| | | <u>6</u> | <u>0; 0</u> | 6 | 0, 3 |
| | | <u>7</u> | <u>1; 0</u> | 7 | 1, 2 |
| | | | | 8 | 1, 3 |
| | | | | 9 | 2, 3 |
| | | | | <u>10</u> | <u>0; 0</u> |
| | | | | <u>11</u> | <u>0; 1</u> |
| | | | | <u>12</u> | <u>1; 0</u> |
| | | | | <u>13</u> | <u>1; 1</u> |
| | | | | <u>14</u> | <u>0, 1; 0</u> |
| | | | | <u>15</u> | <u>0, 1; 0, 1</u> |

In this example, Table C1 adds a new entry (that is, row) to the original table. One new table as shown in Table C2 below is added. Table C2 is another newly-added table. Each row includes at least two groups of SRI values. One group of SRI values on the left of the semicolon and one group of SRI values on the right of the semicolon respectively correspond to the CSI of PUSCHs transmitted by two uplink transmission units. Each group of SRI values may include at least one SRI value, and one group of SRIs may be referred to as one SRI group. The semicolon may also have other representations, such as parentheses, line feed, slashes, and the like, as long as it can be used for dividing the indexes into a plurality of groups.

TABLE C2

Another newly-added table

| Bit Field Mapped to Index | SRI(s), $M_{SRS}$ = 2 | Bit Field Mapped to Index | SRI(s), $M_{SRS}$ = 3 | Bit Field Mapped to Index | SRI(s), $M_{SRS}$ = 4 |
|---|---|---|---|---|---|
| 0 | 0; 0 | 0 | 0; 0 | 0 | 0; 0 |
| 1 | 0; 1 | 1 | 1; 0 | 1 | 0; 1 |
| 2 | 1; 0 | 2 | 0, 1; 0 | 2 | 1; 0 |
| 3 | 1; 1 | 3 | 0, 1; 1 | 3 | 1; 1 |
| | | 4 | 0; 0, 1 | 4 | 0, 1; 0 |

TABLE C2-continued

Another newly-added table

| Bit Field Mapped to Index | SRI(s), $M_{SRS}$ = 2 | Bit Field Mapped to Index | SRI(s), $M_{SRS}$ = 3 | Bit Field Mapped to Index | SRI(s), $M_{SRS}$ = 4 |
|---|---|---|---|---|---|
| | | 5 | 1; 0, 1 | 5 | 0, 1; 1 |
| | | 6 | Reserve | 6 | 0; 0, 1 |
| | | 7 | | 7 | 1; 0, 1 |
| | | | | 8 | 0, 1; 0, 1 |
| | | | | 9 | Reserve |
| | | | | 10 | |
| | | | | 11 | |
| | | | | 12 | |
| | | | | 13 | |
| | | | | 14 | |
| | | | | 15 | |

The indexes of the SRSs indicated in the expanded rows in the expanded table may have other values and are not specified, as long as the number of SRS resource groups indicated in the rows is greater than 1. The rows in the tables may be exchanged. A table including a row with more than one SRS resource group may be a newly-added table. $M_{SRS}$ represents the total number of SRSs of M SRS resource sets. For the underlined rows, the left side of the semicolon ";" represents the SRI value corresponding to the first panel, and the right side of the semicolon represents the SRI value corresponding to the second panel. The semicolon may also have other representations, such as parentheses, line feed, slashes, and the like, as long as it can be used for dividing the indexes into a plurality of groups.

The base station and the terminal agree on any one of Tables C1 to C2 and make an agreement as follows:

If the table is Table C1, in a case where the value of the SRS resource indicator field in the DCI indicates the values of one group of SRIs (corresponding to the non-underlined rows), it represents that the terminal transmits only one PUSCH, and the SRI corresponds to the transmit beam and the number of layers of the first panel. Otherwise, it represents that the terminal has two repetition PUSCHs to transmit. The left side of the semicolon ";" represents SRI0 value corresponding to the first panel, and the right side of the semicolon represents SRI1 value corresponding to the second panel. According to the row indicated by the value of the SRS resource indicator field in the DCI, it is possible to dynamically switch between the repetition transmission and the non-repetition transmission.

If the table is Table C2, the left side of the semicolon ";" represents SRI0 value corresponding to the first panel, and the right side of the semicolon represents SRI1 value corresponding to the second panel. According to the SRI value, the transmit beam (or precoding) and the number of layers corresponding to each panel are obtained.

The terminal performs the following.

(1) M SRS resource sets configured by the base station are received.

(2) SRS resources are transmitted according to the configuration of the M SRS resource sets.

(3) One piece of DCI transmitted by the base station is received, and M pieces of CSI, CSIi, are acquired. i=0, ..., M−1.

The terminal receives the one piece of DCI and determines SRI information of each panel according to a received table configured by the base station.

If the table is Table C1, in a case where the value indicated by the value of the SRS resource indicator field in the DCI includes one SRI group (corresponding to the non-underlined rows), it represents that the terminal transmits only one PUSCH, and the SRI corresponds to the transmit beam and the number of layers of the first panel. Otherwise, it represents that the terminal has two repetition PUSCHs to transmit. The left side of the semicolon ";" represents SRI0 value corresponding to the first panel, and the right side of the semicolon represents SRI1 value corresponding to the second panel. According to the row in which the SRI is located, it is possible to dynamically switch between the repetition transmission and the non-repetition transmission.

If the table is Table C2, the left side of the semicolon ";" represents SRI0 value corresponding to the first panel, and the right side of the semicolon represents SRI1 value corresponding to the second panel. According to the SRI value, the transmit beam (or precoding) and the number of layers corresponding to each panel are obtained. Because the SRS resource indicated by the corresponding SRI uses the same transmit beam or precoding as the PUSCH transmitted by each panel, knowing the value of the SRI of each panel, the transmit beam or precoding of the PUSCH transmitted by the panel may be known. And the number of transmission layers of each panel may be determined by dividing the total number of SRIs by M or determined according to the number of SRIs included in the group of SRIs corresponding to the panel.

Exemplarily, the signaling information includes one piece of downlink control information. The one piece of DCI indicates the CSI (including, but not limited to, the SRI) of M panels, and the uplink transmission is in the non-codebook-based transmission mode. The CSI corresponding to the PUSCH transmitted by each uplink transmission panel is determined according to the SRI and the manner of adding Panel ID in the SRS resource configuration.

The base station configures the following SRI table or the terminal receives the following SRI table configured by the base station, where the table is the same as the related art. Table D1 is the SRI table with Lmax=2. Table D2 is the SRI table with Lmax=4. Lmax may be the maximum number of selected SRIs.

TABLE D1

SRI table with Lmax = 2

| Bit Field Mapped to Index | SRI(s), $N_{SRS} = 2$ | Bit Field Mapped to Index | SRI(s), $N_{SRS} = 3$ | Bit Field Mapped to Index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|  |  | 4 | 0, 2 | 4 | 0, 1 |
|  |  | 5 | 1, 2 | 5 | 0, 2 |
|  |  | 6-7 | reserved | 6 | 0, 3 |
|  |  |  |  | 7 | 1, 2 |
|  |  |  |  | 8 | 1, 3 |
|  |  |  |  | 9 | 2, 3 |
|  |  |  |  | 10-15 | reserved |

TABLE D2

SRI table with Lmax = 4

| Bit Field Mapped to Index | SRI(s), $N_{SRS} = 2$ | Bit Field Mapped to Index | SRI(s), $N_{SRS} = 3$ | Bit Field Mapped to Index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|  |  | 4 | 0, 2 | 4 | 0, 1 |
|  |  | 5 | 1, 2 | 5 | 0, 2 |
|  |  | 6 | 0, 1, 2 | 6 | 0, 3 |
|  |  | 7 | reserved | 7 | 1, 2 |
|  |  |  |  | 8 | 1, 3 |
|  |  |  |  | 9 | 2, 3 |
|  |  |  |  | 10 | 0, 1, 2 |
|  |  |  |  | 11 | 0, 1, 3 |
|  |  |  |  | 12 | 0, 2, 3 |
|  |  |  |  | 13 | 1, 2, 3 |
|  |  |  |  | 14 | 0, 1, 2, 3 |
|  |  |  |  | 15 | reserved |

The SRS resource configured by the base station or the SRS resource transmitted by the terminal includes an index identifying the uplink transmission unit index (panel index) or a higher layer index for uniquely identifying the uplink transmission unit (panel). For example, the SRS resource configured in the higher layer signaling is as follows:

```
SRS-Resource ::=      SEQUENCE {
srs-ResourceId        SRS-ResourceId,
panelId               INTEGER (0... M - 1),
...
}
```

For example, panel0 corresponds to PanelID=0, and panel1 corresponds to PanelID=1.

The base station through transmitting one piece of DCI or the terminal through receiving one piece of DCI determines SRI values corresponding to M panels of the terminal, where the DCI includes an SRS resource indicator field, for example, the ninth row (2, 3) with $M_{SRS}=4$ in the above Table D1. Each SRS resource includes PanelID. If SRS resource1 and SRS resource2 include PanelID being 0, while SRS resource3 and SRS resource4 include PanelID being 1, the above selection represents that two panels are used in the uplink transmission. Moreover, the beam of SRS resource2 corresponding to panel0 is used for transmission of PUSCH0, and the beam of SRS resource3 corresponding to panel1 is used for transmission of PUSCH1.

For example, for the 14$^{th}$ row (0, 1, 2, 3) with $M_{SRS}=4$ in the above Table D2, each SRS resource includes PanelID. If SRS resource1 and SRS resource2 include PanelID being 0, and SRS resource3 and SRS resource4 include PanelID being 1, the above selection represents that the uplink transmission uses two panels. The beam of SRS resource0 corresponding to panel0 and the beam of SRS resource1 corresponding to panel0 transmit PUSCH0, and the transmission is the two-layer transmission. The beam of SRS resource2 corresponding to panel1 and the beam of SRS resource3 corresponding to panel1 transmit PUSCH1, and the transmission is the two-layer transmission.

Notifying the terminal that the transmission of PUSCHs or PUCCHs corresponding to the UE is the repetition transmission includes, but is not limited to, that the physical downlink shared channel information indicated by the two PDCCHs is associated, and that the DCI fields corresponding to the two PDCCHs are all or partially the same.

In one embodiment, the transmission mode of the M physical uplink channels includes repetition transmission and non-repetition transmission. The repetition transmission includes that the intersection of transmission information included in the M physical uplink channels during transmission is not empty. The non-repetition transmission includes at least one of the following: the intersection of transmission information included in the M physical uplink channels during transmission is empty; or the difference set of transmission information included in the M physical uplink channels during transmission is not empty.

The transmission information may be information before channel coding, or a transport block, or one coding block or one large coding block corresponding to multiple coding blocks in the uplink control information.

Exemplarily, the repetition transmission represents that transport blocks transmitted in the M physical uplink shared channels are the same, or the same content is transmitted in the M physical uplink control channels.

In one embodiment, determining the channel state information of the M physical uplink channels based on the signaling information includes at least one of the following: in a case where the relationship between information indicated in the M pieces of downlink control information satisfies the first predetermined condition, determining that the transmission mode of the M physical uplink channels is the repetition transmission; or in a case where the relationship between parameters of M downlink control channels in which the M pieces of downlink control information are located satisfies the second predetermined condition, determining that the transmission mode of the M physical uplink channels is the repetition transmission.

In the case where the channel state information of the M physical uplink channels is determined based on the signaling information, the transmission mode of the M physical uplink channels may be determined as the repetition transmission in at least one of the following cases: the relationship between parameters of M downlink control channels in which the M pieces of downlink control information are located satisfies the second predetermined condition; or the relationship between information indicated in the M pieces of downlink control information satisfies the first predetermined condition.

In one embodiment, the first predetermined condition includes at least one of the following: values of all fields in the M pieces of downlink control information are the same; values of new data indicator fields of the M pieces of downlink control information are the same; values of redundancy version fields of the M pieces of downlink control information are the same; values of modulation and coding scheme fields of the M pieces of downlink control information are the same; or values of hybrid automatic repeat request process number fields of the M pieces of downlink control information are the same.

In one embodiment, the second predetermined condition includes at least one of the following: control resource sets corresponding to the M downlink control channels have the same search space; control resource sets corresponding to the M downlink control channels have the same search space set; physical downlink control channel detection occasions corresponding to the M downlink control channels are the same; physical downlink control channel detection candidates corresponding to the M downlink control channels are the same; the number of uplink sounding signal resource indicators indicated by uplink sounding signal resource indicator fields of the M downlink control channels is 1; or the number of uplink sounding signal resource indicator groups indicated by uplink sounding signal resource indicator fields of the M downlink control channels is 1.

In one embodiment, the association of the hybrid automatic repeat request process corresponding to the M physical uplink channels is used for determining the transmission mode of the M physical uplink channels.

Exemplarily, the association between two HAQR processes is established so that the terminal determines that the transmission of M uplink PUSCHs is the repetition transmission. The base station transmits the CSI through the M pieces of DCI.

The base station configures C CORESETs for the terminal and divides the C CORESETs into M CORESET groups. An index (for example, CoresetGroupID) of a higher layer parameter identifier is included in a CORESET to identify to which CORESET group the CORESET belongs. C and M are positive integers greater than 1, and C is greater than or equal to M. For example, C=M=2. One CORESET group corresponds to one terminal uplink transmission unit (for example, a panel or a panel of a TRP).

In this example, an $i^{th}$ $PDCCH_{i-1}$ transmitted by the base station corresponds to an $i^{th}$ CORESET group, and the $i^{th}$ $PDCCH_{i-1}$ carries $i^{th}$ $DCI_{i-1}$. The HARQ process index corresponding to an $i^{th}$ $PUSCH_{i-1}$ scheduled by the $i^{th}$ $PDCCH_{i-1}$ takes a value from an $i^{th}$ process index set, $HarqIndexSet_{i-1}$, and i=1, . . . , M. For example, when M=2, the first HARQ process index set $HarqIndexSet_0=\{0\text{-}7\}$, and $HarqIndexSet_1=\{8\text{-}15\}$. RRC configures the association between M $HarqIndexSet_{1-1}$ is corresponding to PUSCHs respectively scheduled by M PDCCHs, and i=1, . . . , M. For example, when M=2, it is agreed that a $k^{th}$ process index in $HarqIndexSet_0$ has an association with a $(k+7)^{th}$ process index in $HarqIndexSet_1$, and k=0, . . . , 7. The base station and the terminal agree that if the HARQ process index corresponding to a PUSCH scheduled by $i^{th}$ $DCI_{i-1}$ has an association with the HARQ process index corresponding to a PUSCH scheduled by $j^{th}$ DCI, the transmission of PUSCHs scheduled by the two pieces of DCI is considered to be the repetition transmission; i, j=1, . . . , M, and i is not equal to j. For example, when M=2, i=1, and j=2.

Exemplarily, the information of M PDCCHs determines that the transmission of the M uplink PUSCHs is the repetition transmission. The base station transmits the CSI through M pieces of DCI and determines that the transmission of the M PUSCHs is the repetition transmission mainly through the same process ID.

The base station configures M CORESETs for the terminal. An $i^{th}$ $PDCCH_{i-1}$ transmitted by the base station corresponds to an $i^{th}$ CORESET, and the $i^{th}$ $PDCCH_{i-1}$ carries $i^{th}$ $DCI_{i-1}$. The HARQ process index corresponding to an $i^{th}$ $PUSCH_{i-1}$ scheduled by the $i^{th}$ $PDCCH_{i-1}$ is K0. i=1, . . . , M. K0 is a fixed value, and the value of K0 is any integer from 0 to 15. That is, the terminal receives M pieces of DCI, and if the HARQ process IDs corresponding to the M pieces of PUSCHs scheduled by the M pieces of DCI are the same, the transmission of PUSCHs scheduled by the M pieces of DCI is considered to be the repetition transmission.

The panels corresponding to the M PUSCHs may have one independent buffer for caching the M processes.

In one embodiment, determining the channel state information of the M physical uplink channels based on the signaling information includes that the M physical uplink channels are determined to be transmitted repetitively in a case where M pieces of downlink control information satisfy at least one of the following:

each field is identical; the values of new data indicator (NDI) fields are the same; the values of redundancy version fields after channel coding are the same; the values of modulation and coding scheme fields are the same; the values of hybrid automatic repeat request process number fields are the same; the corresponding control resource sets have the same search space; the corresponding control resource sets have the same search space set; the corresponding physical downlink control channel detection occasions are the same; the corresponding physical downlink control channel detection candidates are the same; the number of uplink sounding signal resource indicators indicated by the uplink sounding signal resource indicator fields is 1; or the number of uplink sounding signal resource indicator groups indicated by the uplink sounding signal resource indicator fields is 1.

Exemplarily, the transmission of M uplink PUSCHs is determined to be the repetition transmission through the information of M PDCCHs. The base station transmits the CSI through M pieces of DCI and determines that the transmission of M PUSCHs scheduled by the DCI field is the repetition transmission mainly through the DCI field.

The base station configures M CORESETs for the terminal. An $i^{th}$ PDCCH$_{i-1}$ transmitted by the base station corresponds to an $i^{th}$ CORESET, and the $i^{th}$ PDCCH$_{i-1}$ carries $i^{th}$ DCI$_{i-1}$. If the M pieces of DCI configured by the base station or M pieces of DCI received by the terminal satisfy at least one of the following conditions: each field of the M pieces of DCI is the same, the values of the new data indicator (NDI) value fields of the M pieces of DCI are the same, the values of the RV fields of the M pieces of DCI are the same, the values of the modulation and coding scheme (MCS) fields of the M pieces of DCI are the same, the values of the HARQ process number fields of the M pieces of DCI are the same, CORESETs corresponding to the M pieces of DCI have the same search space, CORESETs corresponding to the M pieces of DCI have the same search space set, PDCCH monitoring occasions corresponding to the M pieces of DCI are the same, and PDCCH monitoring candidates corresponding to the M pieces of DCI are the same, the terminal considers the transmission of M PUSCHs scheduled by the M pieces of DCI to be the repetition transmission.

If the transmission of M PUSCHs is the repetition transmission and M PUSCHs are transmitted in the same slot, how to determine the transmission slot for the M PUSCHs, that is, whether to calculate the transmission slot for the M PUSCHs based on DCI1 or DCI0, needs to be solved.

In one embodiment, the method includes at least one of the following: determining the time unit in which the M physical uplink channels are located according to the time unit in which predetermined downlink control information in the M pieces of downlink control information is located; determining the time unit in which M physical downlink shared channels are located according to the time unit in which the predetermined downlink control information in the M pieces of downlink control information is located; determining the time unit in which M uplink sounding reference resources are located according to the time unit in which the predetermined downlink control information in the M pieces of downlink control information is located; or determining the time unit of M channel state information reports according to the time unit in which the predetermined downlink control information in the M pieces of downlink control information is located.

In one embodiment, the predetermined downlink control information is at least one of the following: downlink control information having the minimum transmission slot among the M pieces of downlink control information; downlink control information having the maximum transmission slot among the M pieces of downlink control information; downlink control information corresponding to a primary transmission node in the M pieces of downlink control information; downlink control information configured by higher layer signaling; the predefined downlink control information; downlink control information having the minimum physical downlink control channel resource index corresponding to the M pieces of downlink control information; downlink control information having the maximum physical downlink control channel resource index corresponding to the M pieces of downlink control information; downlink control information having the minimum control resource set resource index corresponding to the M pieces of downlink control information; or downlink control information having the maximum control resource set resource index corresponding to the M pieces of downlink control information.

Exemplarily, M pieces of DCI transmitted by the base station may be transmitted in different slots, and the resources scheduled by the M pieces of DCI may be transmitted in the same slot. The transmission slots of the M resources need to be determined, where the resources include, but are not limited to, one of the following: the PUSCHs, PDSCHs, pilot reference signals, PUCCHs, or CSI reports.

When receiving the DCI, the terminal needs to detect a plurality of PDCCH candidates on the corresponding PDCCH monitoring occasion, which requires certain processing time. After acquiring the DCI content corresponding to the PDCCHs, certain time is also needed for demodulating the downlink data or processing and filling the uplink data or signal to be transmitted. For example, it takes time to demodulate the PDSCH, process the PUSCH and PUCCH to be transmitted, and performs the CSI feedback. Therefore, in general, there is a certain offset O in the slot m for transmitting the DCI signaling by the base station and the resource slot k scheduled by the DCI. The definition of the offset takes into account both the capability of the terminal and the system delay, a good balance needs to be done. In wireless communication standards, there is generally one fixed configuration value.

To improve reliability, the TRP or terminal may repetitively transmit one channel or one signal. If the M pieces of DCI are repetitive in terms of content so that the resources (PUSCHs, PDSCHs, pilot reference signals, and PUCCHs) scheduled by the M pieces of DCI are transmitted in the same slot. Alternatively, the M pieces of DCI may have different content, but resources scheduled by the M pieces of DCI are transmitted in the same time unit, for example, using the frequency-division multiplexing, that is, the M resources are transmitted in the same time unit but occupy different physical resource blocks (PRBs). The PRBs may be divided into different groups or sets, and each group or set of PRBs includes at least one PRB, the PRB may be, for example, one of the following concepts: a sub-band, a bandwidth part, a PRB bundling, or a resource block group (RBG). The time unit includes a set of one or more symbols, such as a slot, a mini slot. The slot is a set including a plurality of symbols and is generally one scheduled time unit. Generally speaking, one slot under the normal cyclic prefix includes 14 symbols, and one slot under the extended cyclic prefix includes 12 symbols. The slot may also be a mini slot, and one slot may include at least one mini slot.

If M pieces of DCI are transmitted in different slots, for example, the slot for transmitting $i^{th}$ DCI is $m_i$, according to the related art, the resources scheduled by the M pieces of DCI are transmitted respectively in $(m_i+O)^{th}$ slots, where i=1, ..., M, and M and $m_i$ are positive integers that are different from each other. O is a positive integer or a fixed positive integer configured by the higher layer parameter, representing the slot offset of the transmission slot of the DCI and the resource scheduled by the DCI. However, if the resources scheduled by the M pieces of DCI are transmitted in the same slot, a problem arises.

One approach is to introduce one piece of predetermined DCI. The predetermined DCI is used for calculating the resources scheduled by the M pieces of DCI and the slot problem of the predetermined DCI. Of course, a predetermined PDCCH may be introduced. The predetermined PDCCH is used for carrying the predetermined DCI.

For example, if the transmission slot of the predetermined DCI is m, the slots of the resources scheduled by the M pieces of DCI are $$\left\lfloor m \times \frac{2^{\mu_1}}{2^{\mu_{PDCCH}}} \right\rfloor + O.$$

$\mu_1$, $\mu_{PDCCH}$, and O denote a carrier spacing configuration parameter corresponding to a resource scheduled by the DCI, a carrier spacing configuration parameter corresponding to the transmission of the predetermined DCI, and a slot offset of the resource scheduled by the DCI relative to the slot for transmitting the predetermined DCI, respectively. $\lfloor \bullet \rfloor$ denotes the down-rounding operation. The definition of the predetermined DCI is one of the following: the DCI having the minimum transmission slot among the M pieces of DCI; the DCI having the maximum transmission slot among the M pieces of DCI; the DCI configured by higher layer signaling; the predefined DCI; the DCI with the minimum PDCCH resource index corresponding to the M pieces of DCI; the DCI with the maximum PDCCH resource index corresponding to the M pieces of DCI; the DCI with the minimum CORESET resource index corresponding to the M pieces of DCI; or the DCI with the maximum CORESET resource index corresponding to the M pieces of DCI. The resource scheduled by the DCI in different cases is exemplarily described below by using M=2 as an example.

Example one: M pieces of DCI schedule M PDSCHs, where the transmission slots of the M PDSCHs are determined by the transmission slot of the predetermined DCI and the slot offset Offset1 of $K_0$ between the predetermined DCI and the PDSCH scheduled by the predetermined DCI.

M pieces of DCI are transmitted in different transmission slots, but only one PDSCH is scheduled, or M PDSCHs scheduled by the M pieces of DCI are transmitted in the same slot. The transmission slot of the PDSCH is:

$$TD = \left\lfloor n1 \times \frac{2^{\mu_{PDSCH}}}{2^{\mu_{PDCCH}}} \right\rfloor + K_0.$$

TD denotes the transmission slot of the PDSCH scheduled by the M pieces of DCI. n1 is a positive integer. $\mu_{PDSCH}$ denotes is the carrier spacing configuration parameter (numerology) for transmitting the PDSCH. $\mu_{PDCCH}$ denotes the carrier spacing configuration parameter (numerology) of the physical downlink control channel (PDCCH). $K_0$ denotes the slot offset between the predetermined DCI and the PDSCH scheduled by the predetermined DCI. $K_0$ is related to the system parameter set (such as, numerology) of the PDSCH. According to higher layer signaling and/or physical layer signaling configuration, $K_0$ is 0 or 1, and n1 denotes the slot where the predetermined DCI is located.

Example two: M pieces of DCI schedule M PUSCHs, where the transmission slots of the M PUSCHs are determined by the transmission slot of the predetermined DCI and the slot offset Offset2 of $K_1$ between the predetermined DCI and the PUSCH scheduled by the predetermined DCI.

M pieces of DCI are transmitted in different transmission slots, but only one PUSCH is scheduled, or M PUSCHs scheduled by the M pieces of DCI are transmitted in the same slot. The transmission slot of the PUSCH is:

$$TU = \left\lfloor n1 \times \frac{2^{\mu_{PUSCH}}}{2^{\mu_{PDCCH}}} \right\rfloor + K_1.$$

TU denotes the transmission slot of the PUSCH. n1 denotes the transmission slot of the predetermined DCI. $\mu_{PUSCH}$ denotes the carrier spacing configuration parameter of the PUSCH. $\mu_{PDCCH}$ denotes the carrier spacing configuration parameter of the PDCCH. $K_1$ denotes the slot offset between the predetermined DCI and the PUSCH scheduled by the predetermined DCI. $K_1$ is determined by the information of the system parameter set (such as, numerology) of the PUSCH, including configured according to higher layer signaling and/or physical layer signaling, and $K_1$ is any positive integer from 1 to 6.

Example three: M pieces of DCI schedule M SRS resources, where the transmission slots of the M SRS resources are determined by the transmission slot of the predetermined DCI and the slot offset Offset3 of K3 between the predetermined DCI and the SRS resource scheduled by the predetermined DCI.

M pieces of DCI are transmitted in different transmission slots, but only one SRS resource is scheduled, or M SRS resources scheduled by the M pieces of DCI are transmitted in the same slot. The transmission slot of the SRS resource is:

$$TA = \left\lfloor n1 \times \frac{2^{\mu_{SRS}}}{2^{\mu_{PDCCH}}} \right\rfloor + K3.$$

TA denotes the transmission slot of the SRS resource. n1 denotes the slot in which the predetermined DCI is located. $\mu_{SRS}$ denotes the carrier spacing configuration parameter for transmitting an SRS. $\mu_{PDCCH}$ denotes the carrier spacing configuration parameter for transmission of the PDCCH. K3 denotes the slot offset between the DCI and the SRS resource scheduled by the DCI. K3 is a positive integer and is determined by the slot offset parameter in the SRS resource set in the higher layer signaling, and K3 is any positive integer from 0 to 32.

Example four: M pieces of DCI schedule M CSI reports, where the transmission slots of the M CSI reports are determined by the transmission slot of the predetermined DCI and the slot offset Offset4 of K4 between the predetermined DCI and the CSI report scheduled by the predetermined DCI.

M pieces of DCI are transmitted in different transmission slots, but only one CSI report is scheduled, or M CSI reports scheduled by the M pieces of DCI are transmitted in the same slot. The transmission slot of the CSI report is:

$$TS = \left\lfloor n1 \times \frac{2^{\mu_{CSI}}}{2^{\mu_{PDCCH}}} \right\rfloor + K4.$$

TS denotes the transmission slot of the CSI report. n1 denotes the slot in which the predetermined DCI is located. $\mu_{CSI}$ denotes the carrier spacing configuration parameter for transmitting the CSI report. $\mu_{PDCCH}$ denotes the carrier spacing configuration parameter for transmission of the PDCCH. K4 denotes the slot offset between the DCI and the CSI report scheduled by the DCI. K4 is a positive integer, and K4 is the slot offset parameter determined by the higher layer signaling and/or physical layer parameter.

Example five: M pieces of DCI trigger M CSI-RSs, where the transmission slots of the M CSI-RSs are determined by the transmission slot of the predetermined DCI and the slot offset Offset5 of K5 between the predetermined DCI and the CSI-RS scheduled by the predetermined DCI.

M pieces of DCI are transmitted in different transmission slots, but only one CSI-RS resource or CSI-RS resource set is scheduled, or M CSI-RS resources or CSI-RS resource sets scheduled by the M pieces of DCI are transmitted in the same slot. The transmission slot of the CSI-RS resource or CSI-RS resource set is:

$$TC = \left\lfloor n1 \times \frac{2^{\mu_{CSI-RS}}}{2^{\mu_{PDCCH}}} \right\rfloor + K5.$$

TC denotes the transmission slot of the CSI-RS resource or CSI-RS resource set. n1 denotes the slot in which the predetermined DCI is located. $\mu_{CSI-RS}$ denotes the carrier spacing configuration parameter for transmitting the CSI report. $\mu_{PDCCH}$ denotes the carrier spacing configuration parameter for transmission of the PDCCH. K5 denotes the slot offset between the DCI and the CSI-RS resource or CSI-RS resource set scheduled by the DCI. K5 is a positive integer and is the slot offset parameter determined by the higher layer signaling and/or the physical layer parameter.

The predetermined DCI herein may be referred to as reference DCI.

In one exemplary implementation, the present application provides a method for transmitting signaling information. FIG. 2 is a flowchart of another method for transmitting signaling information according to an embodiment of the present application. The method may be applied to determine the channel state information of the uplink shared channel and may be executed by an apparatus for transmitting signaling information provided by the present application. The apparatus may be implemented by software and/or hardware and integrated on a communication node. The communication node may be a base station. For content not described in detail in this embodiment, reference may be made to the above embodiments, and details are not described here.

As shown in FIG. 2, a method for transmitting signaling information provided by the present application includes S210.

In S210, the signaling information is transmitted. The signaling information is used for indicating the channel state information of M physical uplink channels, where M is a positive integer greater than 1.

The signaling information is used for indicating the channel state information of the M physical uplink channels.

The base station transmits the signaling information, such as to a terminal so that the terminal determines channel state information of each physical uplink channel.

Before transmitting the signaling information, the present application may further include configuring the signaling information. The signaling information is configured to indicate channel state information of the M physical uplink channels.

M is a positive integer greater than 1. To determine the channel state information of the uplink channel in multi-TRP and multi-panel transmission, the communication node in this embodiment, that is, the base station, configures the signaling information to indicate the channel state information of the M physical uplink channels. After configuring the signaling information, the communication node, that is, the base station transmits the signaling information, such as to the terminal so that the terminal determines the channel state information of each physical uplink channel.

This embodiment of the present application provides a method for transmitting signaling information. The signaling information is used for indicating channel state information of the M physical uplink channels. The method effectively determines the channel state information of the plurality of physical uplink channels can be effectively determined through the signaling information during transmission of the multi-panel and multi-TRP.

On the basis of the above embodiments, variant embodiments of the above embodiment are further proposed, for the brevity of description, only differences from the above embodiment will be described in the variant embodiments.

In one embodiment, the signaling information includes M pieces of downlink control information.

In one embodiment, the association between an uplink sounding reference signal resource set and the field value set of the downlink control information indicates the channel state information of the M physical uplink channels.

In one embodiment, the field value set of the downlink control information is divided into M field value sets by values of at least one of the following fields of the downlink control information: a redundancy version field, a carrier indicator field, a bandwidth part indicator field, or an antenna port field.

In one embodiment, the method includes at least one of the following:

indicating the channel state information of the M physical uplink channels by using the association between a redundancy version field value set of the downlink control information and an uplink sounding reference signal resource set; indicating the channel state information of the M physical uplink channels by using the association between a carrier indicator field value set of the downlink control information and an uplink sounding reference signal resource set; indicating the channel state information of the M physical uplink channels by using the association between a bandwidth part indicator field value set of the downlink control information and an uplink sounding reference signal resource set; or indicating the channel state information of the M physical uplink channels by using the association between an antenna ports field value set of the downlink control information and an uplink sounding reference signal resource set.

In one embodiment, the association between the physical downlink control channel information set corresponding to the downlink control information and the uplink transmission unit is used for indicating the channel state information of the M physical uplink channels.

In one embodiment, the physical downlink control channel information set is formed by values of at least one of the following information: a component carrier for transmitting a physical downlink control channel, a bandwidth part for transmitting a physical downlink control channel, a control resource set in which a physical downlink control channel is located, a physical downlink control channel detection occasion, or a physical downlink control channel detection candidate.

In one embodiment, the method includes at least one of the following:

indicating the channel state information of the M physical uplink channels by using the association between a component carrier value set for transmitting a physical downlink control channel and an uplink transmission unit; indicating the channel state information of the M physical uplink channels by using the association between a bandwidth part value set for transmitting a physical downlink control channel and an uplink transmission unit; indicating the channel state information of the M physical uplink channels by using the association between a control resource set value set corresponding to the downlink control information and an uplink transmission unit; indicating the channel state information of the M physical uplink channels by using the association between a physical downlink control channel detection occasion value set corresponding to the downlink control information and an uplink transmission unit; or indicating the channel state information of the M physical uplink channels by using the association between a physical downlink control channel detection candidate value set corresponding to the downlink control information and an uplink transmission unit.

In one embodiment, the channel state information of the M physical uplink channels is indicated by using an uplink transmission unit index of an uplink sounding reference resource or an uplink sounding reference resource set indicated by an uplink sounding reference resource indicator field of the signaling information.

In one embodiment, the signaling information includes the first-level downlink control information. The first-level downlink control information is used for indicating the channel state information of the first physical uplink channel.

One embodiment includes at least one of the following: determining content of second-level downlink control information according to the uplink sounding signal resource indicator field of the first-level downlink control information; or determining the detection status of the second-level downlink control information according to the uplink sounding signal resource information indicated by the first-level downlink control information, where the second-level downlink control information belongs to the M pieces of downlink control information. That is, the uplink sounding signal resource indicator field of the first-level downlink control information is used for determining the content of the second-level downlink control information, and the uplink sounding signal resource information indicated by the first-level downlink control information is used for determining the detection status of the second-level downlink control information.

One embodiment includes at least one of the following:

in a case where the second-level downlink control information is not detected, the number of uplink sounding signal resources indicated by the first-level downlink control information or the number of uplink sounding signal resource groups indicated by the first-level downlink control information is less than a predetermined value; in a case where the content of the second-level downlink control information is empty, the number of uplink sounding signal resources indicated by the first-level downlink control information or the number of uplink sounding signal resource groups indicated by the first-level downlink control information is less than the predetermined value; in a case where the second-level downlink control information is detected, the number of uplink sounding signal resources indicated by the first-level downlink control information or the number of uplink sounding signal resource groups indicated by the first-level downlink control information is greater than or equal to a predetermined value; in a case where content of the second-level downlink control information is not empty, the number of uplink sounding signal resources indicated by the first-level downlink control information or the number of uplink sounding signal resource groups indicated by the first-level downlink control information is greater than or equal to a predetermined value; or in a case where the second-level downlink control information includes the channel state information of the second physical uplink channel, the number of uplink sounding signal resources indicated by the first-level downlink control information or the number of uplink sounding signal resource groups indicated by the first-level downlink control information is greater than or equal to a predetermined value.

The predetermined value is a positive integer and may be 1. Therefore, in a case where the uplink sounding signal resource indicator field of the downlink control information indicates one uplink sounding signal resource indicator or an uplink sounding signal resource indicator group, content of the second-level downlink control information is empty. Alternatively, in a case where the uplink sounding signal resource indicator field of the downlink control information indicates more than one uplink sounding signal resource indicator or more than one uplink sounding signal resource indicator group, the content of the second-level downlink control information includes channel state information for indicating the second physical uplink channel.

In one embodiment, the signaling information includes one piece of downlink control information, an uplink sounding signal resource indicator field in the downlink control information is used for indicating M uplink sounding signal resource indicators, and the M uplink sounding signal resource indicators are configured to determine the channel state information of the M physical uplink channels.

In one embodiment, the signaling information includes one piece of downlink control information, an uplink sounding signal resource indicator field in the downlink control information is used for indicating M uplink sounding signal resource indicator groups, and the M uplink sounding signal resource indicator groups are configured to determine the channel state information of the M physical uplink channels.

In one embodiment, the channel state information of the physical uplink channels includes a channel rank. The channel rank is acquired according to at least one of the following information: the total number of uplink sounding signal resource indicators indicated by the uplink sounding signal resource indicator field in the one piece of downlink control information; or M.

The channel rank is the total number of all SRIs indicated by the uplink sounding signal resource indicator field in the downlink control information divided by M.

In one embodiment, a transmission mode of the M physical uplink channels includes repetition transmission and non-repetition transmission. The repetition transmission includes that the intersection of transmission information included in the M physical uplink channels during transmission is not empty. The non-repetition transmission includes at least one of the following: the intersection of transmission information included in the M physical uplink channels during transmission is empty; or the difference set between transmission information included in the M physical uplink channels during transmission is not empty.

In one embodiment, configuring signaling information includes the following: in a case where the transmission mode of the M physical uplink channels is the repetition transmission, the relationship between information indicated in M pieces of downlink control information satisfies the first predetermined condition; and in a case where the transmission mode of the M physical uplink channels is the repetition transmission, the relationship between parameters of M downlink control channels in which M pieces of downlink control information are located satisfies the second predetermined condition.

In one embodiment, the first predetermined condition includes at least one of the following:

values of all fields in the M pieces of downlink control information are the same; values of new data indicator fields of the M pieces of downlink control information are the same; values of redundancy version fields of the M pieces of downlink control information are the same; values of modulation and coding scheme fields of the M pieces of downlink control information are the same; or values of hybrid automatic repeat request process number fields of the M pieces of downlink control information are the same.

In one embodiment, the second predetermined condition includes at least one of the following: control resource sets corresponding to the M downlink control channels have the same search space; control resource sets corresponding to the M downlink control channels have the same search space set; physical downlink control channel detection occasions corresponding to the M downlink control channels are the same; physical downlink control channel detection candidates corresponding to the M downlink control channels are the same; the number of uplink sounding signal resource indicators indicated by uplink sounding signal resource indicator fields of the M downlink control channels is 1; or the number of uplink sounding signal resource indicator groups indicated by uplink sounding signal resource indicator fields of the M downlink control channels is 1.

In one embodiment, the method includes that the M physical uplink channels are determined to be transmitted repetitively in a case where M pieces of downlink control information satisfy at least one of the following:

each field is identical; the values of new data indicator fields are the same; the values of redundancy version fields after channel coding are the same; the values of modulation and coding scheme fields are the same; the values of hybrid automatic repeat request process number fields are the same; the corresponding control resource sets have the same search space; the corresponding control resource sets have the same search space set; the corresponding physical downlink control channel detection occasions are the same; the corresponding physical downlink control channel detection candidates are the same; the number of uplink sounding signal resource indicators indicated by the uplink sounding signal resource indicator field is 1; or the number of uplink sounding signal resource indicator groups indicated by the uplink sounding signal resource indicator field is 1.

In one embodiment, the method further includes at least one of the following:

determining the time unit in which the M physical uplink channels are located according to the time unit in which the predetermined downlink control information of the M pieces of downlink control information is located; determining the time unit in which M physical downlink shared channels are located according to the time unit in which the predetermined downlink control information of the M pieces of downlink control information is located; determining the time unit in which M uplink sounding reference resources are located according to the time unit in which the predetermined downlink control information of the M pieces of downlink control information is located; or determining the time unit of M channel state information reports according to the time unit in which the predetermined downlink control information of the M pieces of downlink control information is located. That is, the time unit in which M physical uplink channels are located is determined by the time unit in which the predetermined downlink control information of M downlink control information is located.

In one embodiment, the predetermined downlink control information is at least one of the following:

the downlink control information having the minimum transmission slot among the M pieces of downlink control information; the downlink control information having the maximum transmission slot among the M pieces of downlink control information; the downlink control information corresponding to a primary transmission node in the M pieces of downlink control information; the downlink control information configured by higher layer signaling; the predefined downlink control information; the downlink control information having the minimum physical downlink control channel resource index corresponding to the M pieces of downlink control information; the downlink control information having the maximum physical downlink control channel resource index corresponding to the M pieces of downlink control information; the downlink control information having the minimum control resource set resource index corresponding to the M pieces of downlink control information; or the downlink control information having the maximum control resource set resource index corresponding to the M pieces of downlink control information.

The present application provides an apparatus for transmitting signaling information. FIG. 3 is a diagram illustrating the structure of an apparatus for transmitting signaling information according to an embodiment of the present application. The apparatus for transmitting signaling information may be integrated on a communication node, such as a base station. As shown in FIG. 3, the apparatus includes a transmission module 31 configured to transmit signaling information. The signaling information is used for indicating channel state information of the M physical uplink channels. M is a positive integer greater than 1. The apparatus may further include a configuration module configured to configure the signaling information.

The apparatus for transmitting signaling information provided by this embodiment is used for implementing the method for transmitting signaling information shown in FIG. 2. The implementation principle and technical effect of the apparatus for transmitting signaling information provided by this embodiment are similar to the method for transmitting signaling information described in FIG. 2. Details are not described here.

On the basis of the above embodiments, variant embodiments of the above embodiment are further proposed, for the brevity of description, only differences from the above embodiment will be described in the variant embodiments.

In one embodiment, the signaling information includes M pieces of downlink control information.

In one embodiment, the association between the field value set of the downlink control information and an uplink sounding reference signal resource set indicates the channel state information of the M physical uplink channels.

In one embodiment, the field value set of the downlink control information is divided into M field value sets by values of at least one of the following fields of the downlink control information: a redundancy version field, a carrier indicator field, a bandwidth part indicator field, or an antenna port field.

In one embodiment, the apparatus includes at least one of the following: indicating the channel state information of the M physical uplink channels by using the association between a redundancy version field value set of the downlink control information and an uplink sounding reference signal resource set; indicating the channel state information of the M physical uplink channels by using the association between a carrier indicator field value set of the downlink control information and an uplink sounding reference signal resource set; indicating the channel state information of the M physical uplink channels by using the association between a bandwidth part indicator field value set of the downlink control information and an uplink sounding reference signal resource set; or indicating the channel state information of the M physical uplink channels by using the association between an antenna port field value set of the downlink control information and an uplink sounding reference signal resource set.

In one embodiment, the association between the physical downlink control channel information set corresponding to the downlink control information and the uplink transmission unit is used for indicating the channel state information of the M physical uplink channels.

In one embodiment, the physical downlink control channel information set is formed by values of at least one of the following information: a component carrier for transmitting a physical downlink control channel, a bandwidth part for transmitting a physical downlink control channel, a control resource set in which a physical downlink control channel is located, a physical downlink control channel detection occasion, or a physical downlink control channel detection candidate.

In one embodiment, the apparatus includes at least one of the following: indicating the channel state information of the M physical uplink channels by using the association between a component carrier value set for transmitting a physical downlink control channel and an uplink transmission unit; indicating the channel state information of the M physical uplink channels by using the association between a bandwidth part value set for transmitting a physical downlink control channel and an uplink transmission unit; indicating the channel state information of the M physical uplink channels by using the association between a control resource set value set corresponding to the downlink control information and an uplink transmission unit; indicating the channel state information of the M physical uplink channels by using the association between a physical downlink control channel detection occasion value set corresponding to the downlink control information and an uplink transmission unit; or indicating the channel state information of the M physical uplink channels by using the association between a physical downlink control channel detection candidate value set corresponding to the downlink control information and an uplink transmission unit.

In one embodiment, the channel state information of the M physical uplink channels is indicated by using an uplink transmission unit index of an uplink sounding reference resource or an uplink sounding reference resource set indicated by an uplink sounding reference resource indicator field of the signaling information.

In one embodiment, the signaling information includes the first-level downlink control information. The first-level downlink control information is used for indicating the channel state information of the first physical uplink channel.

In one embodiment, the apparatus includes at least one of the following:
determining content of the second-level downlink control information according to the uplink sounding signal resource indicator field of the first-level downlink control information; or determining the detection status of the second-level downlink control information according to the uplink sounding signal resource information indicated by the first-level downlink control information, where the second-level downlink control information belongs to the M pieces of downlink control information.

In one embodiment, the apparatus includes at least one of the following: in a case where the second-level downlink control information is not detected, the number of uplink sounding signal resources indicated by the first-level downlink control information or the number of uplink sounding signal resource groups indicated by the first-level downlink control information is less than a predetermined value; in a case where content of the second-level downlink control information is empty, the number of uplink sounding signal resources indicated by the first-level downlink control information or the number of uplink sounding signal resource groups indicated by the first-level downlink control information is less than the predetermined value; in a case where the second-level downlink control information is detected, the number of uplink sounding signal resources indicated by the first-level downlink control information or the number of uplink sounding signal resource groups indicated by the first-level downlink control information is greater than or equal to the predetermined value; in a case where content of the second-level downlink control information is not empty, the number of uplink sounding signal resources indicated by the first-level downlink control information or the number of uplink sounding signal resource groups indicated by the first-level downlink control information is greater than or equal to the predetermined value; or in a case where the second-level downlink control information includes the channel state information of the second physical uplink channel, the number of uplink sounding signal resources indicated by the first-level downlink control information or the number of uplink sounding signal resource groups indicated by the first-level downlink control information is greater than or equal to the predetermined value.

In a case where the uplink sounding signal resource indicator field of the downlink control information indicates one uplink sounding signal resource indicator or one uplink sounding signal resource indicator group, the content of the second-level downlink control information is empty. Alternatively, in a case where the uplink sounding signal resource indicator field of the downlink control information indicates more than one uplink sounding signal resource indicator or more than one uplink sounding signal resource indicator group, the content of the second-level downlink control information includes channel state information for indicating the second physical uplink channel.

In one embodiment, the signaling information includes one piece of downlink control information, an uplink sounding signal resource indicator field in the downlink control information is used for indicating M uplink sounding signal resource indicators, and the M uplink sounding signal resource indicators are configured to determine the channel state information of the M physical uplink channels.

In one embodiment, the signaling information includes one piece of downlink control information, an uplink sounding signal resource indicator field in the downlink control information is used for indicating M uplink sounding signal resource indicator groups, and the M uplink sounding signal resource indicator groups are configured to determine the channel state information of the M physical uplink channels.

In one embodiment, the channel state information of the physical uplink channels includes a channel rank. The channel rank is acquired according to at least one of the following information: the total number of uplink sounding signal resource indicators indicated by the uplink sounding signal resource indicator field in the one piece of downlink control information; or M.

The channel rank is the total number of all SRIs indicated by the uplink sounding signal resource indicator fields in the downlink control information divided by M.

In one embodiment, the transmission mode of the M physical uplink channels includes repetition transmission and non-repetition transmission. The repetition transmission includes that the intersection of transmission information included in the M physical uplink channels during transmission is not empty. The non-repetition transmission includes at least one of the following: the intersection of transmission information included in the M physical uplink channels during transmission is empty or the difference set between transmission information included in the M physical uplink channels during transmission is not empty.

In one embodiment, the apparatus includes the following: in a case where the transmission mode of the M physical uplink channels is the repetition transmission, the relationship between information indicated in the M pieces of downlink control information satisfies the first predetermined condition; and in a case where the transmission mode of the M physical uplink channels is the repetition transmission, the relationship between parameters of M downlink control channels in which the M pieces of downlink control information are located satisfies the second predetermined condition.

In one embodiment, the first predetermined condition includes at least one of the following: values of all fields in the M pieces of downlink control information are the same; values of new data indicator fields of the M pieces of downlink control information are the same; values of redundancy version fields of the M pieces of downlink control information are the same; values of modulation and coding scheme fields of the M pieces of downlink control information are the same; or values of hybrid automatic repeat request process number fields of the M pieces of downlink control information are the same.

In one embodiment, the second predetermined condition includes at least one of the following: control resource sets corresponding to the M downlink control channels have the same search space; control resource sets corresponding to the M downlink control channels have the same search space set; physical downlink control channel detection occasions corresponding to the M downlink control channels are the same; physical downlink control channel detection candidates corresponding to the M downlink control channels are the same; the number of uplink sounding signal resource indicators indicated by uplink sounding signal resource indicator fields of the M downlink control channels is 1; or the number of uplink sounding signal resource indicator groups indicated by uplink sounding signal resource indicator fields of the M downlink control channels is 1.

In one embodiment, the apparatus includes that the M physical uplink channels are determined to be transmitted repetitively in a case where M pieces of downlink control information satisfy at least one of the following:

each field is identical; the values of new data indicator fields are the same; the values of redundancy version fields after channel coding are the same; the values of modulation and coding scheme fields are the same; the values of hybrid automatic repeat request process number fields are the same; the corresponding control resource sets have the same search space; the corresponding control resource sets have the same search space set; the corresponding physical downlink control channel detection occasions are the same; the corresponding physical downlink control channel detection candidates are the same; the number of uplink sounding signal resource indicators indicated by the uplink sounding signal resource indicator field is 1; or the number of uplink sounding signal resource indicator groups indicated by the uplink sounding signal resource indicator field is 1.

In one embodiment, the apparatus further includes a determination module configured to at least one of the following:

determine the time unit in which the M physical uplink channels are located according to the time unit in which the predetermined downlink control information of the M pieces of downlink control information is located; determine the time unit in which M physical downlink shared channels are located according to the time unit in which the predetermined downlink control information of the M pieces of downlink control information is located; determine the time unit in which M uplink sounding reference resources are located according to the time unit in which the predetermined downlink control information of the M pieces of downlink control information is located; or determine the time unit of M channel state information reports according to the time unit in which the predetermined downlink control information of the M pieces of downlink control information is located.

In one embodiment, the predetermined downlink control information is at least one of the following:

the downlink control information having the minimum transmission slot among the M pieces of downlink control information; the downlink control information having the maximum transmission slot among the M pieces of downlink control information; the downlink control information corresponding to a primary transmission node in the M pieces of downlink control information; the downlink control information configured by higher layer signaling; the predefined downlink control information; the downlink control information having the minimum physical downlink control channel resource index corresponding to the M pieces of downlink control information; the downlink control information having the maximum physical downlink control channel resource index corresponding to the M pieces of downlink control information; the downlink control information having the minimum control resource set resource index corresponding to the M pieces of downlink control information; or the downlink control information having the maximum control resource set resource index corresponding to the M pieces of downlink control information.

The present application further provides an apparatus for transmitting signaling information. FIG. 4 is a diagram illustrating the structure of another apparatus for transmitting signaling information according to an embodiment of the present application. The apparatus may be integrated on a communication node, such as a user terminal. Referring to FIG. 4, the apparatus includes a receiving module 41 and a determination module 42, the receiving module 41 is configured to receive signaling information. The signaling information is used for indicating channel state information of the M physical uplink channels, and M is a positive integer greater than 1. The determination module 42 is configured to determine channel state information of the M physical uplink channels based on the signaling information.

The apparatus for transmitting signaling information provided by this embodiment is used for implementing the method for transmitting signaling information of the embodiments shown in FIG. 1. The implementation principle and technical effect of the apparatus for transmitting signaling information provided by this embodiment are similar to the method for transmitting signaling information of the embodiment shown in FIG. 1. Details are not described here.

On the basis of the above embodiment, variant embodiments of the above embodiment are further proposed, for the brevity of description, only differences from the above embodiment will be described in the variant embodiments.

In one embodiment, the signaling information includes M pieces of downlink control information.

In one embodiment, the association between the field value set of the downlink control information and the uplink sounding reference signal resource set indicates the channel state information of the M physical uplink channels.

In one embodiment, the field value set of the downlink control information is divided into M field value sets by values of at least one of the following fields of the downlink control information: a redundancy version field, a carrier indicator field, a bandwidth part indicator field, or an antenna port field.

In one embodiment, the determination module 42 includes at least one of the following:

the channel state information of the M physical uplink channels is determined by the association between a redundancy version field value set of the downlink control information and an uplink sounding reference signal resource set; the channel state information of the M physical uplink channels is determined by the association between a carrier indicator field value set of the downlink control information and an uplink sounding reference signal resource set; the channel state information of the M physical uplink channels is determined by the association between a bandwidth part indicator field value set of the downlink control information and an uplink sounding reference signal resource set; or the channel state information of the M physical uplink channels is determined by the association between an antenna port field value set of the downlink control information and an uplink sounding reference signal resource set.

In one embodiment, the association between the physical downlink control channel information set corresponding to the downlink control information and the uplink transmission unit is used for indicating the channel state information of the M physical uplink channels.

In one embodiment, the physical downlink control channel information set is formed by values of at least one of the following information:

a component carrier for transmitting a physical downlink control channel, a bandwidth part for transmitting a physical downlink control channel, a control resource set in which a physical downlink control channel is located, a physical downlink control channel detection occasion, or a physical downlink control channel detection candidate.

In one embodiment, the determination module 42 includes at least one of the following:

the channel state information of the M physical uplink channels is determined by the association between a component carrier value set for transmitting a physical downlink control channel and an uplink transmission unit; the channel state information of the M physical uplink channels is determined by the association between a bandwidth part value set for transmitting a physical downlink control channel and an uplink transmission unit; the channel state information of the M physical uplink channels is determined by the association between a control resource set value set corresponding to the downlink control information and an uplink transmission unit; the channel state information of the M physical uplink channels is determined by the association between a physical downlink control channel detection occasion value set corresponding to the downlink control information and an uplink transmission unit; or the channel state information of the M physical uplink channels is determined by the association between a physical downlink control channel detection candidate value set corresponding to the downlink control information and an uplink transmission unit.

In one embodiment, the determination module 42 is configured to determine the channel state information of the M physical uplink channels by using an uplink transmission unit index of an uplink sounding reference resource or an uplink sounding reference resource set indicated by an uplink sounding reference resource indicator field of the signaling information.

In one embodiment, the signaling information includes the first-level downlink control information. The first-level downlink control information is used for determining the channel state information of the first physical uplink channel.

In one embodiment, the determination module 42 includes at least one of the following: determining content of the second-level downlink control information according to the uplink sounding signal resource indicator field of the first-level downlink control information; or determining the detection status of the second-level downlink control information according to the uplink sounding signal resource information indicated in the first-level downlink control information.

The second-level downlink control information belongs to the M pieces of downlink control information In one embodiment, the determination module 42 includes at least one of the following:

in a case where the number of uplink sounding signal resources indicated by the first-level downlink control information or the number of uplink sounding signal resource groups indicated by the first-level downlink control information is less than a predetermined value, not detecting the second-level downlink control information; in a case where the number of uplink sounding signal resources indicated by the first-level downlink control information or the number of uplink sounding signal resource groups indicated by the first-level downlink control information is less than the predetermined value, content of the second-level downlink control information being empty; in a case where the number of uplink sounding signal resources indicated by the first-level downlink control information or the number of uplink sounding signal resource groups indicated by the first-level downlink control information is greater than or equal to the predetermined value, detecting the second-level downlink control information; in a case where the number of uplink sounding signal resources indicated by the first-level downlink control information or the number of uplink sounding signal resource groups indicated by the first-level downlink control information is greater than or equal to the predetermined value, the content of the second-level downlink control information being not empty; or in a case where the number of uplink sounding signal resources indicated by the first-level downlink control information or the number of uplink sounding signal resource groups indicated by the first-level downlink control information is greater than or equal to the predetermined value, the second-level downlink control information including the channel state information of the second physical uplink channel.

In one embodiment, the signaling information includes one piece of downlink control information, an uplink sounding signal resource indicator field in the downlink control information indicates M uplink sounding signal resource indicators, and the M uplink sounding signal resource indicators are configured to determine the channel state information of the M physical uplink channels.

In one embodiment, the signaling information includes one piece of downlink control information, an uplink sounding signal resource indicator field in the downlink control information indicates M uplink sounding signal resource indicator groups, and the M uplink sounding signal resource indicator groups are configured to determine channel state information of the M physical uplink channels.

In one embodiment, the channel state information of the physical uplink channels includes a channel rank. The channel rank is acquired according to at least one of the following information: the total number of uplink sounding signal resource indicators indicated by the uplink sounding signal resource indicator field in one piece of downlink control information; or M.

The channel rank is the total number of all SRIs indicated by the uplink sounding signal resource indicator field in the downlink control information divided by M.

In one embodiment, the transmission mode of the M physical uplink channels includes repetition transmission and non-repetition transmission. The repetition transmission includes that the intersection of transmission information included in the M physical uplink channels during transmission is not empty. The non-repetition transmission includes at least one of the following: the intersection of transmission information included in the M physical uplink channels during transmission is empty or the difference set between transmission information included in the M physical uplink channels during transmission is not empty.

In one embodiment, the determination module 42 is configured to, in a case where the relationship between information indicated in the M pieces of downlink control information satisfies the first predetermined condition, determine that the transmission mode of the M physical uplink channels is the repetition transmission; or in a case where the relationship between parameters of M downlink control channels in which M pieces of downlink control information are located satisfies the second predetermined condition, determine that the transmission mode of the M physical uplink channels is the repetition transmission.

In one embodiment, the first predetermined condition includes at least one of the following:

values of all fields in the M pieces of downlink control information are the same; values of new data indicator fields of the M pieces of downlink control information are the same; values of redundancy version fields of the M pieces of downlink control information are the same; values of modulation and coding scheme fields of the M pieces of downlink control information are the same; or values of hybrid automatic repeat request process number fields of the M pieces of downlink control information are the same.

In one embodiment, the second predetermined condition includes at least one of the following: control resource sets corresponding to the M downlink control channels have the same search space; control resource sets corresponding to the M downlink control channels have the same search space set; physical downlink control channel detection occasions corresponding to the M downlink control channels are the same; physical downlink control channel detection candidates corresponding to the M downlink control channels are the same; the number of uplink sounding signal resource indicators indicated by uplink sounding signal resource indicator fields of the M downlink control channels is 1; or the number of uplink sounding signal resource indicator groups indicated by uplink sounding signal resource indicator fields of the M downlink control channels is 1.

In one embodiment, the transmission mode of the M physical uplink channels is determined through the association of hybrid automatic repeat request processes corresponding to the M physical uplink channels.

In one embodiment, the determination module 42 is configured to determine the M physical uplink channels to be transmitted repetitively in a case where M pieces of downlink control information satisfy at least one of the following:

each field is identical; values of new data indicator fields are the same; values of redundancy version fields after channel coding are the same; values of modulation and coding scheme fields are the same; values of hybrid automatic repeat request process number fields are the same; the corresponding control resource sets have the same search space; the corresponding control resource sets have the same search space set; the corresponding physical downlink control channel detection occasions are the same; the corresponding physical downlink control channel detection candidates are the same; the number of uplink sounding signal resource indicators indicated by the uplink sounding signal resource indicator field is 1; or the number of uplink sounding signal resource indicator groups indicated by the uplink sounding signal resource indicator field is 1.

In one embodiment, the apparatus further includes a time unit determination module configured to at least one of the following: determine the time unit in which the M physical uplink channels are located according to the time unit in which the predetermined downlink control information of the M pieces of downlink control information is located; determine the time unit in which M physical downlink shared channels are located according to the time unit in which the predetermined downlink control information of the M pieces of downlink control information is located; determine the time unit in which M uplink sounding reference resources are located according to the time unit in which the predetermined downlink control information of the M pieces of downlink control information is located; or determine the time unit of M channel state information reports according to the time unit in which the predetermined downlink control information of the M pieces of downlink control information is located.

In one embodiment, the predetermined downlink control information is at least one of the following:

the downlink control information having the minimum transmission slot among the M pieces of downlink control information; the downlink control information having the maximum transmission slot among the M pieces of downlink control information; the downlink control information corresponding to a primary transmission node in the M pieces of downlink control information; the downlink control information configured by higher layer signaling; the predefined downlink control information; the downlink control information having the minimum physical downlink control channel resource index corresponding to the M pieces of downlink control information; the downlink control information having the maximum physical downlink control channel resource index corresponding to the M pieces of downlink control information; the downlink control information having the minimum control resource set resource index corresponding to the M pieces of downlink control information; or the downlink control information having the maximum control resource set resource index corresponding to the M pieces of downlink control information.

This embodiment of the present application provides a communication node. FIG. 5 is a diagram illustrating the structure of a communication node according to an embodiment of the present application. Referring to FIG. 5, the present application provides a communication node including one or more processors 51 and a storage apparatus 52. The processor 51 in the first terminal may be one or more. One processor 51 is taken as an example in FIG. 5. The storage apparatus 52 is used for storing one or more programs. The one or more programs are executed by the one or more processors 51 so that the one or more processors 51 implement the method as described in the embodiments corresponding to FIG. 2 of the present application.

The communication node further includes a communication apparatus 53, an input apparatus 54, and an output apparatus 55.

The processor 51, the storage apparatus 52, the communication apparatus 53, the input apparatus 54, and the output apparatus 55 in the communication node may be connected through a bus or other measures, the bus is taken as an example in FIG. 5.

The input apparatus 54 may be used for receiving input digital or character information and generating key signal input related to the function control and user setting of the communication node. The output apparatus 55 may include a display device such as a display screen.

The communication apparatus 53 may include a receiver and a transmitter. The communication apparatus 53 is configured to perform information transmission/reception communication according to the control of the processor 51, for example, transmitting signaling information.

As a computer-readable storage medium, the storage apparatus 52 may be configured to store software programs, computer-executable programs, and modules, such as program instructions/modules (for example, the transmission module 31 in the apparatus for transmitting signaling information) corresponding to the method described in the embodiments corresponding to FIG. 2 of the present application. The storage apparatus 52 may include a program storage area and a data storage area. The program storage area may store an operating system and an application program required for implementing at least one function while the data storage area may store data created depending on use of communication nodes. In addition, the storage apparatus 52 may include a high-speed random access memory, and may also include a nonvolatile memory, such as at least one disk memory, flash memory or another nonvolatile solid-state memory. In some examples, the storage apparatus 52 may include memories which are remotely disposed with respect to the processor 51, and these remote memories may be connected to the communication node through a network. Examples of the preceding networks include, and are not limited to, the Internet, an intranet, a local area network, a mobile communication network and a combination thereof.

Figure 6:
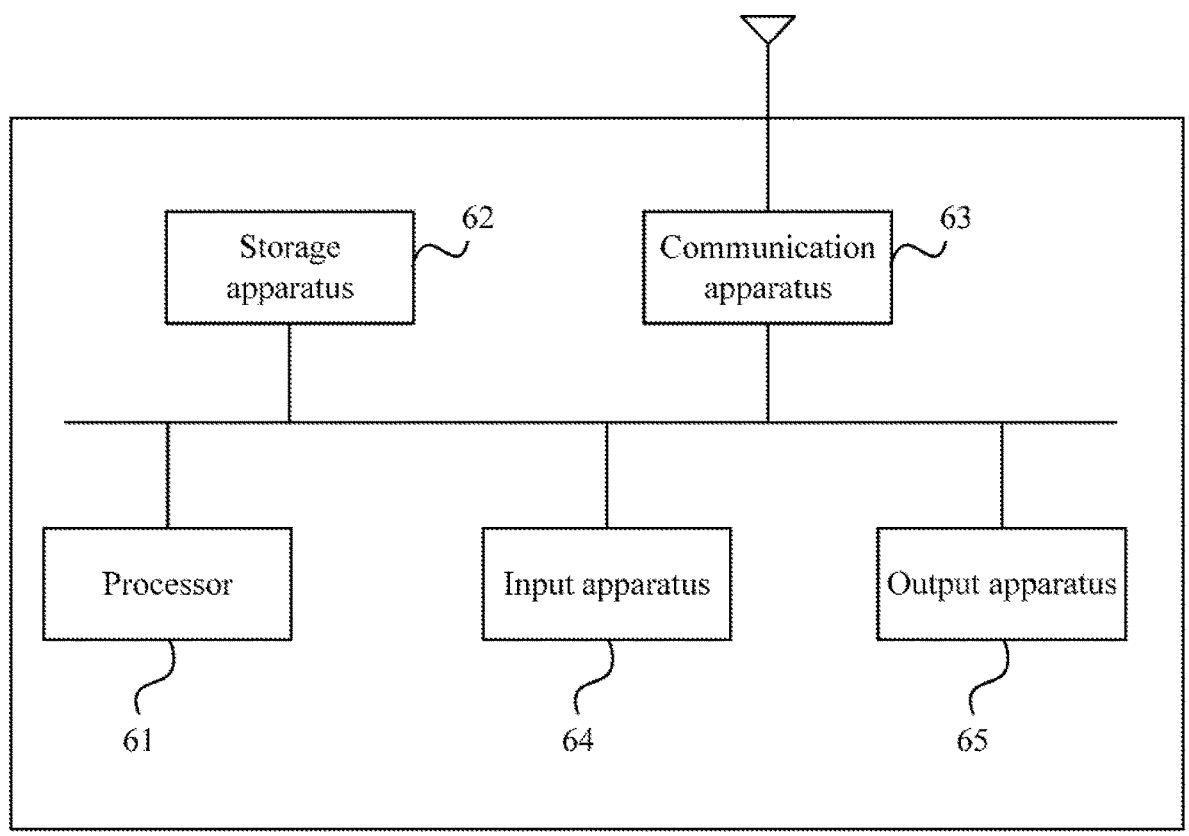
FIG. 6 is a diagram illustrating the structure of another communication node according to an embodiment of the present application.

This embodiment of the present application provides a communication node. FIG. 6 is a diagram illustrating the structure of another communication node according to an embodiment of the present application. Referring to FIG. 6, the present application provides a communication node including one or more processors 61 and a storage apparatus 62. The processor 61 in the communication node may be one or more. One processor 61 is taken as an example in FIG. 6. The storage apparatus 62 is used for storing one or more programs. The one or more programs are executed by the one or more processors 61 so that the one or more processors 61 implement the method as described in the embodiment corresponding to FIG. 1 of the present application.

The communication node further includes a communication apparatus 63, an input apparatus 64, and an output apparatus 65.

The processor 61, the storage apparatus 62, the communication apparatus 63, the input apparatus 64, and the output apparatus 65 in the communication node may be connected through a bus or other measures, the bus is taken as an example in FIG. 6.

The input apparatus 64 may be used for receiving input digital or character information and generating key signal input related to the function control and user setting of the communication node. The output apparatus 65 may include a display device such as a display screen.

The communication apparatus 63 may include a receiver and a transmitter. The communication apparatus 63 is configured to perform information transmission/reception communication according to the control of the processor 61, for example, transmitting signaling information.

As a computer-readable storage medium, the storage apparatus 62 may be configured to store software programs, computer-executable programs, and modules, such as program instructions/modules (for example, the receiving module 41 and determination module 42 in the apparatus for transmitting signaling information) corresponding to the method described in the embodiments corresponding to FIG. 1 of the present application. The storage apparatus 62 may include a program storage area and a data storage area. The program storage area may store an operating system and an application program required for implementing at least one function while the data storage area may store data created depending on use of communication nodes. In addition, the storage apparatus 62 may include a high-speed random access memory, and may also include a nonvolatile memory, such as at least one disk memory, flash memory or another nonvolatile solid-state memory. In some examples, the storage apparatus 62 may include memories which are remotely disposed with respect to the processor 61, and these remote memories may be connected to the communication node through a network. Examples of the preceding networks include, and are not limited to, the Internet, an intranet, a local area network, a mobile communication network and a combination thereof.

The embodiment of the present application further provides a storage medium. The storage medium stores a computer program. When the computer program is executed by a processor, any method is implemented according to the embodiments of the present application. A method for transmitting signaling information includes configuring signaling information and transmitting the signaling information. The signaling information is used for indicating channel state information of the M physical uplink channels, and M is a positive integer greater than 1. Another method for transmitting signaling information includes receiving signaling information and determining channel state information of the M physical uplink channels based on the signaling information. The signaling information is used for indicating channel state information of the M physical uplink channels, and M is a positive integer greater than 1.

The above are only exemplary embodiments of the present application and are not intended to limit the scope of the present application.

The term terminal covers any suitable type of wireless user equipment, such as a mobile phone, a portable data processing apparatus, a portable web browser, or an in-vehicle mobile station.

In general, multiple embodiments of the present application may be implemented in hardware, a dedicated circuit, software, logic, or any combination thereof. For example, some aspects may be implemented in hardware while other aspects may be implemented in firmware or software that may be executed by a controller, a microprocessor, or other computing apparatuses, although the present application is not limited thereto.

Embodiments of the present application may be implemented by a data processor of a mobile apparatus executing computer program instructions. The implementation, for example, may be in a processor entity, by hardware, or by a combination of software and hardware. The computer program instructions may be assembly instructions, instruction set architecture (ISA) instructions, machine instructions, machine-related instructions, microcodes, firmware instructions, state setting data, or source codes or object codes written in any combination of one or more programming languages.

The block diagrams of any logic flows in the drawings of the present application may represent program steps, or may represent interconnected logic circuits, modules, and functions, or may represent a combination of program steps, logic circuits, modules, and functions. The computer program may be stored in a memory. The memory may be in any type suitable for the local technical environment and may be implemented using any suitable data storage technology, for example, but not limited to, a read-only memory (ROM), a random-access memory (RAM), and an optical memory apparatus and system (a digital video disc (DVD) or a compact disc (CD)). The computer-readable storage medium may include a non-transitory storage medium. The data processor may be in any type suitable for the local technical environment, for example, but not limited to, a general-purpose computer, a special-purpose computer, a microprocessor, a digital signal processor (DSP), an application specific integrated circuit (ASIC), a field-programmable gate array (FGPA), and a processor based on a multi-core processor architecture.

What is claimed is:

1. A method for transmitting signaling information, comprising:
   receiving signaling information; and
   determining channel state information of M physical uplink channels based on the signaling information, wherein M is a positive integer greater than 1;
   wherein a transmission mode of the M physical uplink channels comprises repetition transmission and non-repetition transmission, wherein the repetition transmission comprises that an intersection of transmission information comprised in the M physical uplink channels during transmission is not empty, and the non-repetition transmission comprises at least one of the following: an intersection of transmission information comprised in the M physical uplink channels during transmission is empty or a difference set between transmission information comprised in the M physical uplink channels during transmission is not empty.

2. The method of claim 1, wherein the signaling information comprises M pieces of downlink control information.

3. The method of claim 2, wherein determining the channel state information of the M physical uplink channels based on the signaling information comprises at least one of the following:
   determining the channel state information of the M physical uplink channels based on an association between an uplink sounding reference signal resource set and a redundancy version field value set of the M pieces of downlink control information;
   determining the channel state information of the M physical uplink channels based on an association between an uplink sounding reference signal resource set and a carrier indicator field value set of the M pieces of downlink control information;
   determining the channel state information of the M physical uplink channels based on an association between an uplink sounding reference signal resource set and a bandwidth part indicator field value set of the M pieces of downlink control information; or
   determining the channel state information of the M physical uplink channels based on an association between an uplink sounding reference signal resource set and an antenna port field value set of the M pieces of downlink control information.

4. The method of claim 2, wherein determining the channel state information of the M physical uplink channels based on the signaling information comprises at least one of the following:
   determining the channel state information of the M physical uplink channels based on an association between an uplink transmission unit and a component carrier value set for transmission of a physical downlink control channel;
   determining the channel state information of the M physical uplink channels based on an association between an uplink transmission unit and a bandwidth part value set for transmission of a physical downlink control channel;
   determining the channel state information of the M physical uplink channels based on an association between an uplink transmission unit and a control resource set value set corresponding to the M pieces of downlink control information;
   determining the channel state information of the M physical uplink channels based on an association between an uplink transmission unit and a physical downlink control channel detection occasion value set corresponding to the M pieces of downlink control information; or
   determining the channel state information of the M physical uplink channels based on an association between an uplink transmission unit and a physical downlink control channel detection candidate value set corresponding to the M downlink control information.

5. The method of claim 2, wherein determining the channel state information of the M physical uplink channels based on the signaling information comprises:
   determining the channel state information of the M physical uplink channels based on an uplink transmission unit index of an uplink sounding reference resource or an uplink sounding reference resource set indicated by an uplink sounding reference resource indicator field of the signaling information.

6. The method of claim 2, wherein the signaling information comprises first-level downlink control information, and the first-level downlink control information is configured to determine channel state information of a first physical uplink channel.

7. The method of claim 6, wherein determining the channel state information of the M physical uplink channels based on the signaling information comprises at least one of the following:
   determining content of second-level downlink control information according to an uplink sounding signal resource indicator field of the first-level downlink control information; or
   determining detection status of second-level downlink control information according to uplink sounding signal resource information indicated in the first-level downlink control information,
   wherein the second-level downlink control information belongs to the M pieces of downlink control information.

8. The method of claim 6, wherein determining the channel state information of the M physical uplink channels based on the signaling information comprises at least one of the following:
   in a case where a number of uplink sounding signal resource groups or a number of uplink sounding signal resources indicated by the first-level downlink control information is less than a predetermined value, not detecting second-level downlink control information;
   in a case where a number of uplink sounding signal resource groups or a number of uplink sounding signal resources indicated by the first-level downlink control information is less than a predetermined value, determining that content of second-level downlink control information is empty;
   in a case where a number of uplink sounding signal resource groups or a number of uplink sounding signal resources indicated by the first-level downlink control information is greater than or equal to a predetermined value, detecting second-level downlink control information;
   in a case where a number of uplink sounding signal resource groups or a number of uplink sounding signal resources indicated by the first-level downlink control information is greater than or equal to a predetermined value, determining that content of second-level downlink control information is not empty; or
   in a case where a number of uplink sounding signal resource groups or a number of uplink sounding signal resources indicated by the first-level downlink control information is greater than or equal to a predetermined value, determining that second-level downlink control information comprises channel state information of a second physical uplink channel.

9. The method of claim 1, wherein the signaling information comprises one piece of downlink control information, an uplink sounding signal resource indicator field in the downlink control information indicates M uplink sounding signal resource indicators, and the M uplink sounding signal resource indicators are configured to determine the channel state information of the M physical uplink channels.

10. The method of claim 1, wherein the signaling information comprises one piece of downlink control information, an uplink sounding signal resource indicator field in the downlink control information indicates M uplink sounding signal resource indicator groups, and the M uplink sounding signal resource indicator groups are configured to determine the channel state information of the M physical uplink channels.

11. The method of claim 10, wherein the channel state information of the M physical uplink channels comprises a channel rank, wherein the channel rank is acquired according to at least one of: a total number of uplink sounding signal resource indicators indicated by the uplink sounding signal resource indicator field in the downlink control information, or a value of M.

12. The method of claim 1, wherein determining the channel state information of the M physical uplink channels based on the signaling information comprises at least one of the following:
   in a case where a relationship between information indicated in the M pieces of downlink control information satisfies a first predetermined condition, determining that the transmission mode of the M physical uplink channels is the repetition transmission; or
   in a case where a relationship between parameters of M downlink control channels in which the M pieces of downlink control information are located satisfies a second predetermined condition, determining that the transmission mode of the M physical uplink channels is the repetition transmission.

13. The method of claim 12, wherein the first predetermined condition comprises at least one of the following:
   values of all fields in the M pieces of downlink control information are the same;
   values of new data indicator fields of the M pieces of downlink control information are the same;
   values of redundancy version fields of the M pieces of downlink control information are the same;
   values of modulation and coding scheme fields of the M pieces of downlink control information are the same; or
   values of hybrid automatic repeat request process number fields of the M pieces of downlink control information are the same; or
   wherein the second predetermined condition comprises at least one of the following:
   control resource sets corresponding to the M downlink control channels have a same search space;
   control resource sets corresponding to the M downlink control channels have a same search space set;
   physical downlink control channel detection occasions corresponding to the M downlink control channels are the same;
   physical downlink control channel detection candidates corresponding to the M downlink control channels are the same;
   a number of uplink sounding signal resource indicators indicated by an uplink sounding signal resource indicator field of the M downlink control channels is 1; or
   a number of uplink sounding signal resource indicator groups indicated by an uplink sounding signal resource indicator field of the M downlink control channels is 1.

14. The method of claim 2, further comprising at least one of the following:
   determining a time unit in which the M physical uplink channels are located according to a time unit in which predetermined downlink control information of the M pieces of downlink control information is located;
   determining a time unit in which M physical downlink shared channels are located according to a time unit in which predetermined downlink control information of the M pieces of downlink control information is located;
   determining a time unit in which M uplink sounding reference resources are located according to a time unit in which predetermined downlink control information of the M pieces of downlink control information is located; or determining a time unit of M channel state information reports according to a time unit in which predetermined downlink control information of the M pieces of downlink control information is located.

15. The method of claim 14, wherein the predetermined downlink control information comprises at least one of the following:

downlink control information having a minimum transmission slot among the M pieces of downlink control information;

downlink control information having a maximum transmission slot among the M pieces of downlink control information;

downlink control information corresponding to a primary transmission node in the M pieces of downlink control information;

downlink control information configured by higher layer signaling;

predefined downlink control information;

downlink control information having a minimum physical downlink control channel resource index corresponding to the M pieces of downlink control information;

downlink control information having a maximum physical downlink control channel resource index corresponding to the M pieces of downlink control information;

downlink control information having a minimum control resource set resource index corresponding to the M pieces of downlink control information; or downlink control information having a maximum control resource set resource index corresponding to the M pieces of downlink control information.

16. A non-transitory storage medium, the storage medium storing a computer program, wherein when the computer program is executed by a processor, the method for transmitting signaling information of claim 1 is implemented.

17. A method for transmitting signaling information, comprising:

transmitting signaling information, wherein the signaling information is configured to indicate channel state information of M physical uplink channels, and M is a positive integer greater than 1;

wherein a transmission mode of the M physical uplink channels comprises repetition transmission and non-repetition transmission, wherein the repetition transmission comprises that an intersection of transmission information comprised in the M physical uplink channels during transmission is not empty, and the non-repetition transmission comprises at least one of the following: an intersection of transmission information comprised in the M physical uplink channels during transmission is empty or a difference set between transmission information comprised in the M physical uplink channels during transmission is not empty.

18. A communication node, comprising:

at least one processor; and a storage apparatus configured to store at least one program;

wherein when the at least one program is executed by the at least one processor, the at least one processor is caused to implement the method for transmitting signaling information of claim 17.

19. A non-transitory storage medium, the storage medium storing a computer program, wherein when the computer program is executed by a processor, the method for transmitting signaling information of claim 17 is implemented.

20. A communication node, comprising:

at least one processor; and a storage apparatus configured to store at least one program;

wherein when the at least one program is executed by the at least one processor, the at least one processor is caused to implement the following:

receiving signaling information; and determining channel state information of M physical uplink channels based on the signaling information, wherein M is a positive integer greater than 1;

wherein a transmission mode of the M physical uplink channels comprises repetition transmission and non-repetition transmission, wherein the repetition transmission comprises that an intersection of transmission information comprised in the M physical uplink channels during transmission is not empty, and the non-repetition transmission comprises at least one of the following: an intersection of transmission information comprised in the M physical uplink channels during transmission is empty or a difference set between transmission information comprised in the M physical uplink channels during transmission is not empty.

* * * * *